(12) United States Patent
Shimada et al.

(10) Patent No.: US 8,926,309 B2
(45) Date of Patent: Jan. 6, 2015

(54) METHOD OF MANUFACTURING REINFORCING CLOTH OF A SEAT PAD AND APPARATUS THEREFOR

(75) Inventors: Masanori Shimada, Nagoya (JP); Koji Wakamatsu, Nagoya (JP); Toshio Iwasawa, Kanagawa (JP); Shunpei Ishida, Osaka (JP); Minoru Nakano, Itami (JP)

(73) Assignees: Toyota Tsusho Corporation, Aichi (JP); Mold Technical Office Co. Ltd., Kanagawa (JP); Nitto Boseki Co. Ltd., Fukushima (JP)

( * ) Notice: Subject to any disclaimer, the term of this patent is extended or adjusted under 35 U.S.C. 154(b) by 173 days.

(21) Appl. No.: 12/370,678

(22) Filed: Feb. 13, 2009

(65) Prior Publication Data

US 2009/0191298 A1 Jul. 30, 2009

(51) Int. Cl.
| | |
|---|---|
| *B29C 43/00* | (2006.01) |
| *B29C 51/00* | (2006.01) |
| *B29C 43/10* | (2006.01) |
| *B60N 2/58* | (2006.01) |
| *B60N 2/70* | (2006.01) |
| *D04H 1/00* | (2006.01) |
| *B29C 35/04* | (2006.01) |
| *B29C 51/10* | (2006.01) |
| *B29C 51/28* | (2006.01) |
| *B29C 43/36* | (2006.01) |
| *B29K 105/08* | (2006.01) |
| *B29L 31/30* | (2006.01) |
| *B29L 31/00* | (2006.01) |

(52) U.S. Cl.
CPC .............. *B29C 51/004* (2013.01); *B29C 43/10* (2013.01); *B60N 2/5875* (2013.01); *B60N 2/7017* (2013.01); *D04H 1/005* (2013.01); *B29C 35/045* (2013.01); *B29C 35/049* (2013.01); *B29C 51/10* (2013.01); *B29C 51/28* (2013.01); *B29C 2043/3644* (2013.01); *B29C 2791/006* (2013.01); *B29K 2105/0854* (2013.01); *B29L 2031/30* (2013.01); *B29L 2031/3005* (2013.01); *B29L 2031/771* (2013.01)
USPC ..................... 425/387.1; 425/389; 425/403

(58) Field of Classification Search
CPC ...... B29C 51/004; B29C 51/14; B29C 51/365
USPC .............. 425/387.1, 389, 469, 403, 504, 508, 425/405.1
See application file for complete search history.

(56) References Cited

U.S. PATENT DOCUMENTS 2,392,108 A * 1/1946 Vidal et al. ...................... 249/65
3,134,148 A * 5/1964 Taccone ........................ 164/170
(Continued)

FOREIGN PATENT DOCUMENTS

| JP | 52-70176 | 6/1977 |
| JP | 62-162060 | 7/1987 |

(Continued)

*Primary Examiner* — James Sanders
(74) *Attorney, Agent, or Firm* — Gottlieb, Rackman & Reisman, P.C.

(57) ABSTRACT

An apparatus for manufacturing a reinforcing cloth of a seat pad which includes: a mold for fixing a sheet and having an outer shape substantially identical to a shape of the reinforcing cloth and provided with a plurality of air holes interconnecting an internal space with an outer surface; a closed space between the mold and a cover member formed by covering the sheet fixed on the mold with the cover member; a heating unit for heating the sheet; and an exhausting unit for exhausting air from the closed space is provided.

18 Claims, 18 Drawing Sheets

(56) References Cited

U.S. PATENT DOCUMENTS

| | | |
|---|---|---|
| 4,323,410 A | 4/1982 | Urai |
| 4,692,199 A * | 9/1987 | Kozlowski et al. ............ 156/245 |
| 4,702,376 A | 10/1987 | Pagliaro |
| 4,718,153 A * | 1/1988 | Armitage et al. .............. 29/91.1 |
| 4,744,848 A * | 5/1988 | Andrews et al. .............. 156/224 |
| 5,000,805 A | 3/1991 | Lowe |
| 5,123,985 A * | 6/1992 | Evans et al. ................... 156/213 |
| 5,190,809 A | 3/1993 | Marissen et al. |
| 5,328,540 A * | 7/1994 | Clayton et al. ................ 156/285 |
| 5,679,197 A * | 10/1997 | Haupt et al. ................... 156/212 |
| 6,120,630 A | 9/2000 | Lorbiecki |
| 6,257,866 B1 * | 7/2001 | Fritz et al. .................. 425/387.1 |

FOREIGN PATENT DOCUMENTS

| | | |
|---|---|---|
| JP | 02-061153 | 3/1990 |
| JP | 4-105921 | 4/1992 |
| JP | 05-130923 | 5/1993 |
| JP | 05-138782 | 6/1993 |
| JP | 05-220830 | 8/1993 |
| JP | 10-291267 | 11/1998 |
| JP | 2000-062061 | 2/2000 |
| JP | 2005-028626 | 2/2005 |

* cited by examiner

METHOD OF MANUFACTURING REINFORCING CLOTH OF A SEAT PAD AND APPARATUS THEREFOR

This application is a divisional application of U.S. patent application Ser. No. 11/367,606 filed Mar. 4, 2006, which issued as U.S. Pat. No. 7,758,802 on Jul. 20, 2010, which in turn claims priority from JP P2005-062894 filed Mar. 7, 2005 and JP P2006-031487 filed Feb. 8, 2006.

BACKGROUND OF THE INVENTION

1. Field of the Invention

The present invention relates to a method of manufacturing a reinforcing cloth of a seat pad and an apparatus therefor, especially for a seat of a vehicular seat.

2. Related Background of the Invention

For a vehicular seat, there is used a seat pad, in which a urethane resin or the like is foamed as a cushioning material (as described in Japanese unexamined patent publication No. Hei. 5-130923). In addition to the foamed urethane resin, another cushioning material of a fibrous cushioning material is also proposed (as described in Japanese unexamined patent publication No. Hei. 10-291267). The fibrous cushioning material is made from fiber webs including high melting point fibers as base fibers and low melting point fibers as binder fibers.

A seat pad coated with a cloth or a skin provides a surface for supporting a passenger on the front surface side, and the rear surface side of the seat pad is mounted on a support member such as a pipe frame or a spring so that the seat pad constructs a sheet of a vehicular seat. Since at least a part of the rear surface of the seat pad rubs the support member by vibrations of the vehicle and the body motion of the passenger or the like, the seat pad is easily damaged. Therefore, conventionally, a reinforcing cloth as a reinforcing layer is provided on the rear surface of the seat pad.

The reinforcing cloth of the seat pad protects the seat pad against the damage so that it is so formed integrally with the seat pad as not to slip on or peel off the seat pad. Therefore, for the foaming and shaping steps for manufacturing the seat pad, there is adopted a method including the step of injecting and foaming a resin into the mold with the reinforcing cloth being set in advance on the inner surface of the mold and the step of simultaneously performing the shaping of the seat pad and the forming of a reinforcing layer.

Since the rear surface of the seat pad has a complicated shape (e.g., roundabout portions 14 and 15 shown in FIG. 9 and FIG. 10), conventionally, the reinforcing cloth is formed by sewing a number of small pieces in order to match the complicated shape. However, such a seat pad has problems that the cutting and the sewing take many labors and require long time to manufacture. Moreover, there is another problem that it is difficult to fit the reinforcing cloth into the shape of an inner surface of a mold precisely. In order to solve these problems, therefore, there is proposed a method of manufacturing the reinforcing cloth by molding a nonwoven fabric as described in Japanese unexamined patent publication No. Hei. 5-130923.

As a nonwoven fabric used for a reinforcing cloth of a seat pad, other structures has been proposed as described in Japanese unexamined patent publications No. Hei. 5-138782 and 2000-62061. In these publications, an air-impermeable plastic film is mounted on the nonwoven fabric, or a layer of a different apparent density is laminated, in order to prevent the exudation of a resin during foaming and shaping steps.

SUMMARY OF THE INVENTION

When a reinforcing cloth of a seat pad is to be molded, roundabout portions exist due to a shape of a rear surface of a mold. According to the molding method using a male die and a female die, as described in Japanese unexamined patent publication No. Hei. 5-130923, a desired shape cannot be obtained by a single pressing. Therefore, after a nonwoven fabric is shaped into a moldable shape, the reinforcing cloth is obtained by performing the step of turning back the roundabout portions in the molded nonwoven fabric.

Since a shape required for a mold of this molding method is relatively simple, a general pressing apparatus can be employed. However, the method needs efforts for shaping the roundabout portions after molding a nonwoven fabric into the mold, thereby to complicate the works. Moreover, at the foaming and shaping step for manufacturing the seat pad, efforts are also exerted to reinforce the turned-back portions, which were lowered in strength by the turning-back step, with adhesive members for easy handling at the time of attaching to the foaming mold.

Moreover, the pressing step according to the aforementioned molding method needs selvages protruding from the shape of the seat-pad reinforcing cloth. However, those selvages are not needed when the cloth is used so that they have to be cut off. This cutting-off causes a loss of the material for the nonwoven fabric.

Therefore, an object of the present invention is to provide a method of and an apparatus for manufacturing a reinforcing cloth of a seat pad, which is easy to mold the reinforcing cloth, involves less trouble for working after shaping, and suffers little loss in material.

According to the present invention, a method of manufacturing a reinforcing cloth of a seat pad comprises: fixing a sheet on a mold having an outer shape substantially identical to a shape of the reinforcing cloth and provided with a plurality of air holes interconnecting an internal space with an outer surface; forming a closed space between the mold and a cover member by covering the sheet fixed on the mold with the cover member; heating the sheet; shaping the heated sheet into a shape following the outer shape of the mold by exhausting air from the closed space through the air holes; and demolding the sheet from the mold after removing the cover member.

In the method of the present invention, the sheet is molded by fixing it on the mold, which is given a shape substantially identical to that of the seat pad, so that the molded sheet takes substantially the same shape as that of the desired reinforcing cloth. As a result, not only the molding of the complicated shape of the roundabout portions can be facilitated, but also the turning-back or the like after the molding can be eliminated. Moreover, any selvage is not formed in the molded sheet so that it is not necessary to cut off after the molding and the loss of the material is reduced.

Moreover, the sheet may have a structure of two or more layers, in which a nonwoven fabric is laminated on at least one surface of a resin exudation preventing sheet. By using such a sheet, the resin can be prevented from exuding, when the seat pad is molded of a urethane resin to form the reinforcing layer after the reinforcing cloth was molded.

Moreover, the sheet may be either a sheet, in which a granular thermoplastic resin is contained in a nonwoven fabric, or a nonwoven fabric sheet, in which low melting point fibers and high melting point fibers are mixed. By using these sheets, the reinforcing cloth is enabled to be easily molded but also to have a proper rigidity after the molding so that the shape is kept satisfactory.

Moreover, the sheet may be fixed by magnets when fixing the sheet on the mold. Owing to this, the sheet can be prevented from coming out when air is released from the closed space.

Moreover, the method of the present invention may further comprise exhausting the air in the closed space through the air holes of the mold before heating the sheet. Since the air in the closed space is once exhausted before the sheet is heated, the sheet can be brought into close contact with the mold by the cover member and be easily molded in accordance with the outer shape of the mold.

Moreover, heated air may be supplied to the closed space when heating the sheet. Owing to this, it is possible to reduce the possibility for the sheet to be peeled from the mold by the flow of the heated air even in case the sheet is held in close contact with the mold.

Moreover, heated air may be supplied to the closed space through the air holes of the mold by supplying the heated air to the internal space. Owing to this, the heating of the sheet can be efficiently performed by the heats from both the heated air and the mold.

When forming the closed space, the closed space may be formed by at least a mold, a cover member, and a cover frame which is formed so as to enclose the mold and to which is fixed the cover member. Owing to this, it is possible to form the closed space by a movement of the cover frame, thereby facilitating formation of the closed space and also shortening a time required for formation.

According to the present invention, an apparatus for manufacturing a reinforcing cloth of a sheet pad comprises: a mold for fixing a sheet, the mold having an outer shape substantially identical to a shape of the reinforcing cloth and provided with a plurality of air holes interconnecting an internal space with an outer surface; a cover member forming a closed space by covering the mold; a heating unit heating the sheet; and an exhausting unit for exhausting air in the closed space.

According to the apparatus for manufacturing a reinforcing cloth of a seat pad of the present invention, the sheet is molded by fixing it on the mold, which is given a shape substantially identical to that of the sheet pad, so that the molded sheet takes substantially the same shape as that of the desired reinforcing cloth. As a result, not only the molding of the complicated shape of the roundabout portions can be facilitated, but also the turning-back or the like after the molding can be eliminated. Moreover, any selvage is not formed at the molded sheet so that it is not necessary to cut off after the molding and the loss of the material is reduced.

Moreover, the heating unit may supply heated air to the closed space. With this construction, it is possible to reduce the possibility for the sheet to be peeled from the mold by the flow of the heated air even in case the sheet is held in close contact with the mold.

Moreover, the heating unit may supply heated air to the closed space through the air holes by supplying the heated air to the internal space of the mold. With this construction, the heating of the sheet can be efficiently performed by the heats from both the heated air and the mold.

Further, the manufacturing apparatus may preferably further comprises a cover frame to enclose the mold and to which the cover member is fixed, and the closed space is preferably formed by at least the mold, the cover member, and the cover frame. With this construction, it is possible to form the closed space by a movement of the cover frame (at least a portion of the cover frame), thereby facilitating formation of the closed space and also shortening a time required for the formation.

Further, the cover frame may preferably include a pair of movable frames capable of being separated in a horizontal direction, and the cover member is fixed to each of the movable frames. With this construction, compared with a case where the mold is covered using a bag-shaped film as the cover member without using the movable frame, a time required for forming a closed space and for securing a space for demolding of the sheet after processing from the mold can be shortened.

Moreover, the movable frame may preferably include a duct for interconnecting the inside and the outside of the closed space. With this construction, it is possible to exhaust an air in the closed space and to supply a heated air to the closed space via not only air holes of the mold but also a duct of the movable frame, and therefore, a time required for manufacturing of the seat-pad reinforcing cloth can be shortened.

Further, the cover member may be arranged so as to have a pleat portion in a state before air in the closed space is exhausted. With this construction, since the pleat portion acts as an elongation margin when the sheet is processed to have a shape along an outer shape of the mold, the cover member can exhibit higher shape followability against a mold having a complex shape or a large roundabout portion.

Further, the cover member may include an elastic cord fixed thereto so as to maintain a shape of the pleat portion. With this construction, when an air in the closed space is exhausted in a step for processing the sheet to have a shape along an outer shape of the mold, a large deformation to cope with an approximate shape (outline shape) of the mold can be followed by a deformation of the elastic cord while a small deformation to cope with details of the mold can be followed by a deformation of the pleat portion. Accordingly, in a case where the cover member is greatly deformed to follow the approximate shape of the mold (e.g., initial stage of exhausting), pleat portions are prevented from being one-sided to specific portion of the mold and therefore, the cover member can exhibit higher shape followability for a mold having a complex shape or a large wrap-around portion.

The elastic cord is preferably fixed to the cover member so as to intersect the pleat portion. With this construction, elongation margin does not become insufficient at processing since the pleat portion 441 does not become one-sided to specific portion of the cover member 440 due to own weight of the cover member 440 or the like before processing.

The cover member may include a main layer with airtightness and a reinforcing layer with tensile strength higher than that of the main layer, and the reinforcing layer may be disposed on a surface of the main layer at a side where the cover member makes contact with the mold. With this construction, even in a case where a thin and easily elongated material is used for the main layer, a damage of the main layer attributable to an elongation at processing can be suppressed by the reinforcing layer and therefore, durability of the cover member against repeated use is improved.

The reinforcing layer may be preferably made of expandable raw materials in knit form. With this construction, when an air in the closed space is exhausted and the reinforcing layer comes to contact with the mold, the reinforcing layer made of raw materials in knit form acts as a buffer layer with respect to the main layer. Accordingly, durability of the cover member against repeated use is improved.

DESCRIPTION OF THE PREFERRED EMBODIMENTS

Embodiments of the present invention will be described with reference to the accompanying drawings. Although the embodiments of the invention are exemplified by a reinforcing cloth of a seat pad to be used for the backrest of a vehicular seat, the present invention can also be applied to the seat portion of the vehicular seat or another portion using a reinforcing cloth of a seat pad.

Figure 1:
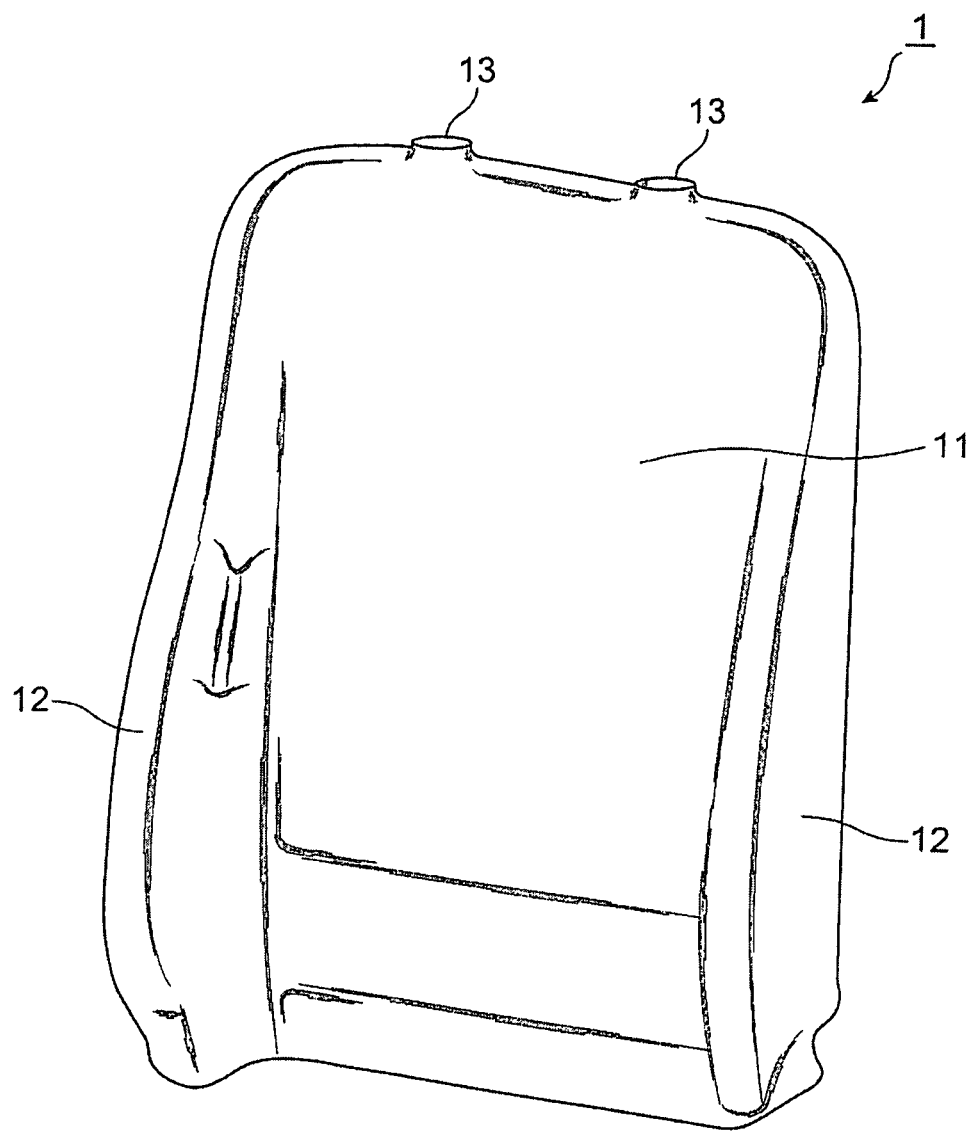
FIG. 1 is a perspective view of a seat-pad reinforcing cloth.

FIG. 1 is a perspective view showing one example of the reinforcing cloth of a seat pad, which is manufactured by a method of manufacturing a reinforcing cloth of a seat pad or an apparatus for manufacturing a reinforcing cloth of a seat pad according to the present invention.

A reinforcing cloth 1 of a seat pad (hereinafter, referred to as a seat-pad reinforcing cloth 1) is molded of a roughly cut sheet by a later-described mold 20, and has a shape corresponding to a sheet for a vehicular seat (not shown). Specifically, the reinforcing cloth 1 includes a back portion 11 corresponding to the surface to confront the back of a user; side portions 12 corresponding to the portions extending toward the user and having shapes to hold the user on the right and left sides; and through holes 13 corresponding to the portions, to which a headrest or the like is attached. As shown in the sectional views of FIGS. 9 and 10, the molded seat-pad reinforcing cloth 1 is further provided with roundabout portions 14 and 15.

The material for the sheet to be molded into the seat-pad reinforcing cloth 1 can be exemplified by a nonwoven fabric, but should not be especially limited, if the material has permeability to the air.

In case the nonwoven fabric is used as a material for the sheet for the seat-pad reinforcing cloth 1, the sheet made of the nonwoven fabric can be used. In addition, it is also possible to use a sheet having a structure of two or more layers, in which the nonwoven fabric sheet is laminated on at least one side of the resin exudation preventing sheet, which is hard for a liquid such as a resin to penetrate. Incidentally, the resin exudation prevention, as termed herein, means the property, in which resin such as a urethane resin used and molded into the seat pad is hard to penetrate. Due to using this material, the resin can be prevented from exuding when the seat pad is molded from a urethane resin and the reinforcing layer thereof is formed by a method as of the prior art after the seat-pad reinforcing cloth was molded. The material for the low-penetration sheet to be used as the resin exudation preventing sheet can be exemplified by a polyurethane film and a high-density nonwoven fabric of a slow penetration, such as one made of a urethane resin.

Further, the sheet to be used for molding the seat-pad reinforcing cloth 1 can be exemplified by a sheet, in which a granular thermoplastic resin is contained in a nonwoven fabric, or by a nonwoven fabric sheet, in which low melting point fibers and high melting point fibers are mixed. In case these nonwoven fabric sheets are used, the thermoplastic resin or the low melting point fibers are melted, at the time of heating the nonwoven fabric sheet in the later-described method of the invention, so that the nonwoven fabric sheet is softened to facilitate the molding of the seat-pad reinforcing cloth 1. Moreover, the seat-pad reinforcing cloth 1 is given a proper rigidity, because it is cooled and solidified after molded, so that the shape of the cloth is kept satisfactory.

In the case of a sheet in which the granular thermoplastic resin is contained in the nonwoven fabric, it is preferred to use a granular hot-melt adhesive resin (or an adhesive) as the thermoplastic resin to be contained. This thermoplastic resin can be exemplified by a polyamide resin, a polyester resin, a polyvinyl chloride resin, a polyethylene resin, a polyethylene vinyl acetate resin, a polyurethane resin, a polyvinyl alcohol resin or a polybutyral resin, or mixture thereof. The thermoplastic resin is preferred to have a melting point of 70 to 100° C. The granular hot-melt adhesive is preferred to have a diameter of 200 µm or less, and the diameter distribution may be changed, if necessary.

On the other hand, in the case of the sheet in which the low melting point fibers and the high melting point fibers are mixed in the nonwoven fabric, the following materials can be used.

The material used for the low melting point fibers has a melting point lower than that of the high melting point fibers. Further, the material used for the low melting point fibers has a specific softening point and a specific molten viscosity. The low melting point fibers are specified by the hot-melt type adhesive fibers, which can be melted to fuse the high melting point fibers when they are mixed with the high melting point fibers and heated to a temperature lower than the melting point of the high melting point fibers. Moreover, the fibers to be employed preferably have a thickness of about 1.5 to 10 d (deniers).

These low melting point fibers are exemplified by thermoplastic fibers such as polyester, polyethylene, polypropylene, acryl, nylon, polyvinyl alcohol or polyvinyl chloride. These fibers may be used either solely, or in a conjugate type or a core-sheathed structure by combining them with the high melting point fibers. No specific restriction is exerted on the fineness or length of the low melting point fibers. These low melting point fibers are preferred to have a melting point of about 100 to 160° C. (or a softening point of about 80 to 140° C.). Moreover, the low melting point fibers are preferred to have a steam activity, which is proper especially for the case, in which heated steam is used when the nonwoven fabric sheet is heated in the later-described method of the invention.

Polyester, polypropylene, acryl, nylon or the like is used for the high melting point fibers. No specific restriction is imposed on the fineness and length of the high melting point fibers. These high melting point fibers may have a melting point of 180° C. or higher (or a softening point of 160° C. or higher). Moreover, the difference in the melting point (or in the softening point) between the low melting point fibers and the high melting point fibers is preferred to be 50° C. or more.

The mixing percentage of the low melting point fibers and the high melting point fibers is preferable at 20 to 70 weight % for the low melting point fibers and at 30 to 80 weight % for the high melting point fibers. If the mixing percentage of the low melting point fibers is 20 weight % or less, the fused portion may become less for the desired rigidity. If the mixing percentage of the low melting point fibers is 70 weight % or more, the rigidity appears so prominent as to make the demolding from the mold difficult. In addition, the surface of the molded sheet is plasticized to leave no fiber so that rubbing noises are easily made when the sheet is used as the seat-pad reinforcing cloth.

Hereinafter, a "nonwoven fabric sheet" means a sheet using a nonwoven fabric for molding the seat-pad reinforcing cloth 1. On principle, moreover, a nonwoven fabric sheet before molded will be described as the "nonwoven fabric sheet", and a nonwoven fabric sheet after molded will be described as a "seat-pad reinforcing cloth".

Next, an apparatus according to the present invention for manufacturing the seat-pad reinforcing cloth (the reinforcing cloth of a seat pad) will be described with reference to FIGS. 2, 5, 9 and 10.

Figure 2:
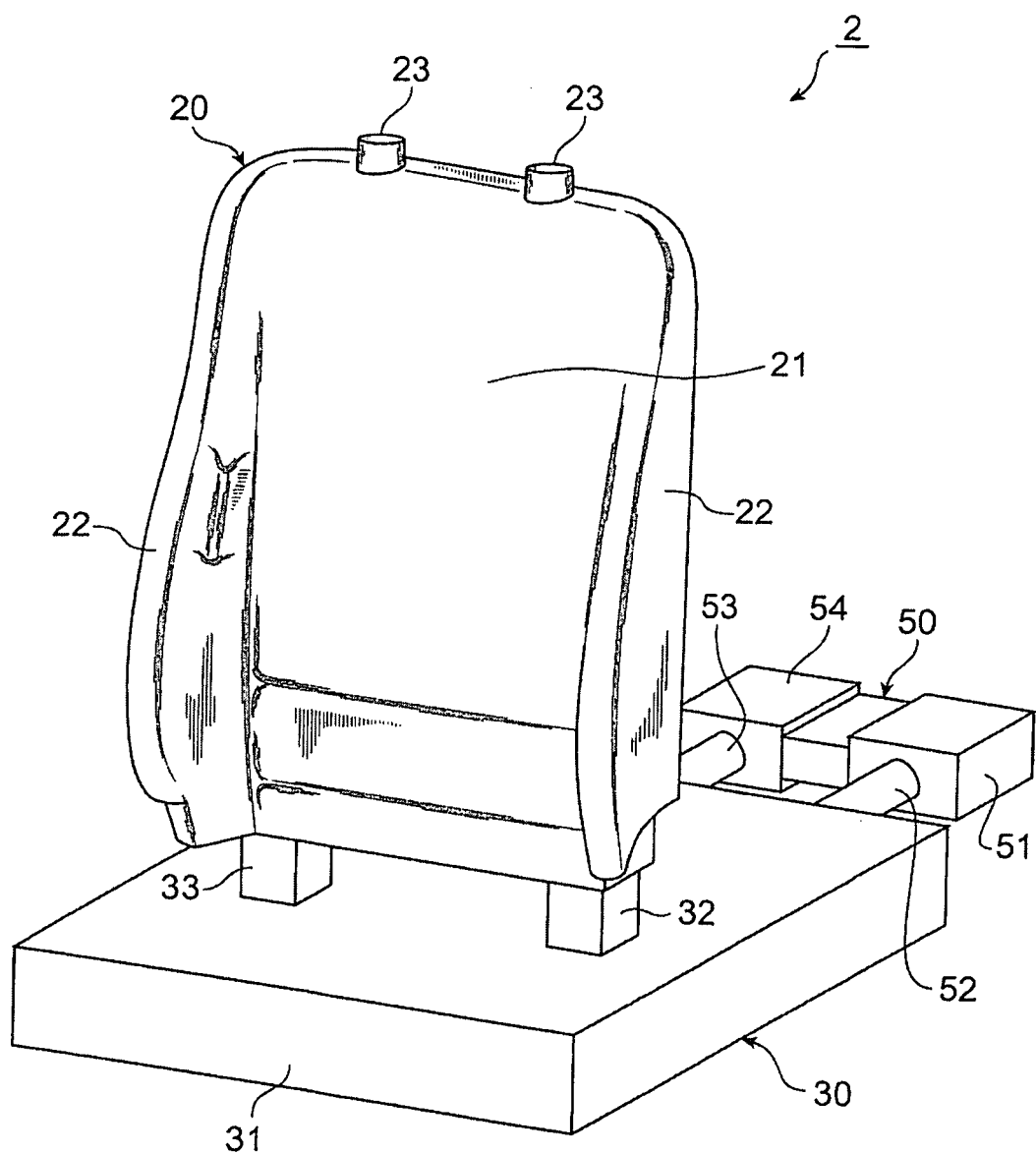
FIG. 2 is a perspective view showing a manufacturing apparatus for a seat-pad reinforcing cloth according to the first embodiment.

FIG. 2 is a perspective view showing an apparatus 2 for manufacturing the seat-pad reinforcing cloth.

The manufacturing apparatus 2 includes a mold 20; a base portion 30 on which the mold 20 is fixed; a cover member 40 (as referred to FIG. 5 and so on) fixed on the base portion 30 while covering the mold 20 for forming a closed space 41; and an air supply/exhaust unit 50 for supplying air to the closed space 41 and exhausting air from the closed space 41.

The mold 20 has an outer shape formed into a substantially identical shape as that of the seat-pad reinforcing cloth 1, and has an internal space 26 (as referred to FIGS. 9 and 10) therein. The mold 20 includes a front surface portion 21, side surface portions 22, cylindrical portions 23, a rear surface portion 24 (as referred to FIGS. 9 and 10), and a plurality of air holes 25 (as referred to FIGS. 9 and 10). The front surface portion 21 of the mold 20 provides a portion for molding the back portion 11 of the seat-pad reinforcing cloth 1, and the side surface portions 22 provide portions for molding the side portions 12 and the roundabout portions 15 (as referred to FIG. 10) of the seat-pad reinforcing cloth 1. Moreover, the cylindrical portions 23 of the mold 20 provide portions for molding the peripheries of the through holes 13 of the seat-pad reinforcing cloth 1, and the rear surface portion 24 provides a portion for molding the roundabout portion 14 (as referred to FIG. 9) of the seat-pad reinforcing cloth 1.

The air holes 25 are formed to provide interconnection from the outer surface of the mold 20 to the internal space 26, and act as air passages when the air is supplied to the closed space 41 and exhausted from the closed space 41 by the air supply/exhaust unit 50. The air holes 25 are formed in each of the front surface portion 21, the side surface portions 22, the cylindrical portions 23 and the rear surface portion 24. Here, it is preferable that there are more numbers of the air holes 25 formed in the corner portions (i.e., portions A of FIG. 9 and portions B of FIG. 10) than in the remaining portions, so that the seat-pad reinforcing cloth 1 may follows the shape of the mold 20.

Although the material for the mold 20 is not especially limited, it is preferably exemplified by aluminum for the aspects of workability and thermal conductivity.

The base portion 30 includes a base 31, an air-supply leg 32 and an air-exhaust leg 33. Both the air-supply leg 32 and the air-exhaust leg 33 are erected from the base 31 and attached to the mold 20. The air-supply leg 32 and the air-exhaust leg 33 are made hollow and connected to the internal space 26 of the mold 20 so that they provide air passages connecting the closed space 41 and the air supply/exhaust unit 50, together with the air supply/exhaust passages (not shown) in the base 31.

The cover member 40 is not restricted in specific shape and size, so long as the cover member 40 can cover the mold 20 having a nonwoven fabric fixed thereon, but is preferably exemplified by a bag-shaped film for easy handling. Though, in FIG. 5, the cover member 40 is fixed with respect to the base 31, it is sufficient that the cover member 40 is fixed to form the closed space 41 for covering a nonwoven fabric sheet 1B, which will become the seat-pad reinforcing cloth 1 after molded. Accordingly, the cover member 40 may also be fixed on the air-supply leg 32 and the air-exhaust leg 33.

The cover member 40 is heated and is repeatedly made inflated and closely contacted with the nonwoven fabric sheet 1B and the mold 20 by the air supply/exhaust of the air supply/exhaust unit 50. Therefore, the material for the cover member 40 is selected to have properties for satisfying these points.

The seat-pad reinforcing cloth to be used for the backrest of the vehicular seat, as shown in FIG. 1, is preferred to have an elongation of 300% or more and a thickness of about 30 to 100 μm when molded. In case moldings of a relatively simple shape such as the seat-pad reinforcing cloth for the seat portion of the vehicular seat are to be made, the elongation of the cover material may be lower than 300%. Considering these points, the material for the cover member 40 (of the bag-shaped film) can be exemplified by polyurethane of an elongation of 300% and a thickness of 50 μm.

The air supply/exhaust unit 50 includes an air-supply unit 51 (heating unit); an air-supply tube 52 for connecting the air-supply unit 51 and the air-supply passage in the base portion 30; an air-exhaust unit 54; and an air-exhaust tube 53 for connecting the air-exhaust unit 54 and the air-exhaust passage in the base portion 30.

The air-supply unit 51 (heating unit) is enabled to heat the mold 20 and the nonwoven fabric sheet 1B by supplying the heated air to the internal space 26 of the mold 20 through the air-supply passage and the air-supply leg 32 in the base 31. The heated air is supplied to the closed space 41 through the internal space 26 of the mold 20 and through the air holes 25 so that the cover member 40 is inflated according to the supply of the heated air. Here, this heated air includes not only the merely heated air but also heated steam. In case this heated steam is used, the time period for the nonwoven fabric sheet 1B to be melted and solidified can be shortened (especially, in case the nonwoven fabric sheet 1B is made of a sheet, in which a granular thermoplastic resin is contained in a nonwoven fabric, or a sheet, in which low melting point fibers and high melting point fibers are mixed). That is, the time period for molding the reinforcing cloth can be shortened.

The air-exhaust unit 54 is not specifically restricted, if it is a device capable of exhausting the air of the closed space 41 through the air holes 25, the internal space 26 of the mold 20, the air-exhaust leg 33, the air-exhaust passage (not shown) in the base portion 30, and the air-exhaust tube 53.

Figure 8:
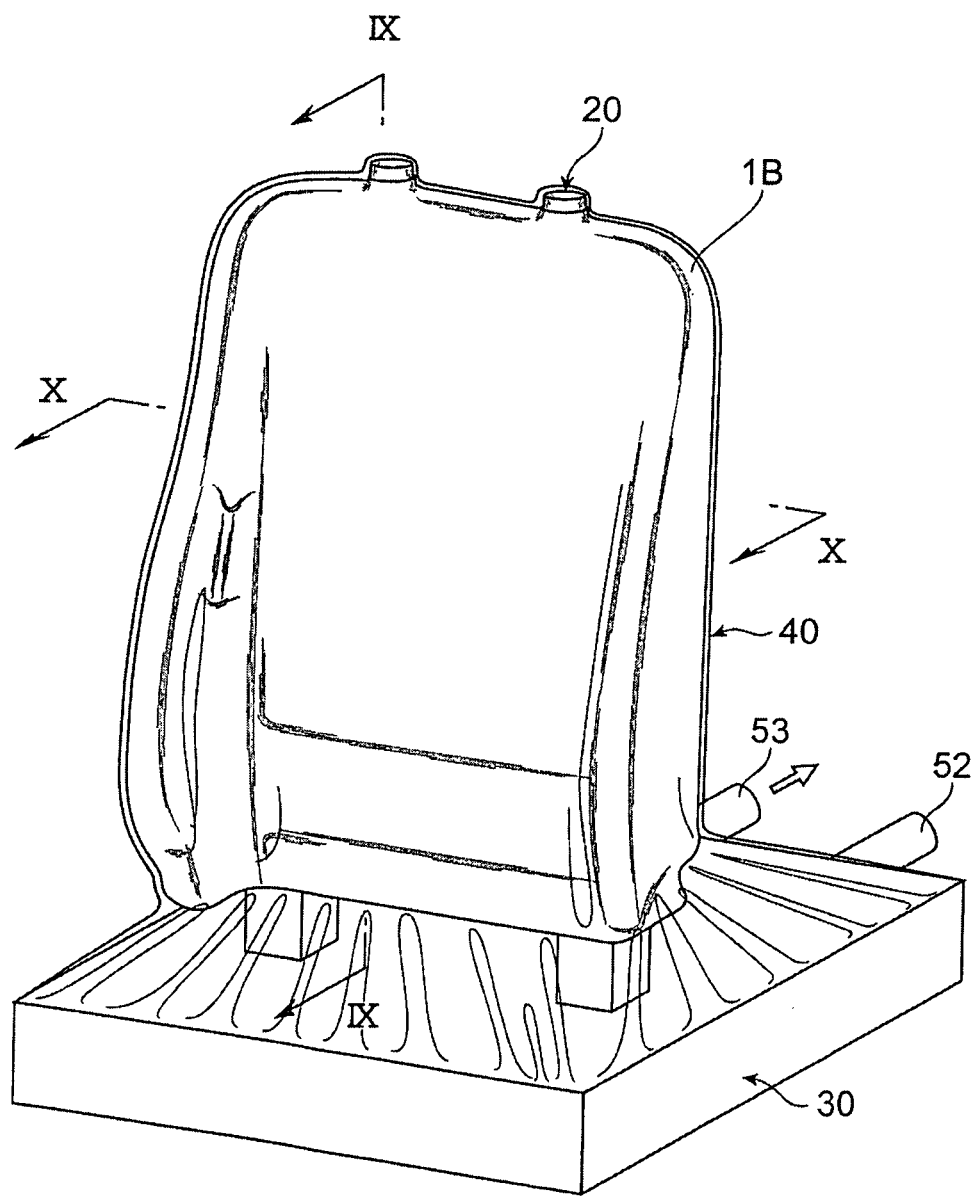
FIG. 8 is a view for explaining the step of shaping the nonwoven fabric sheet into a shape following the outer shape of the mold, by exhausting the air from the closed space defined by the mold and the cover member.
Figure 9:
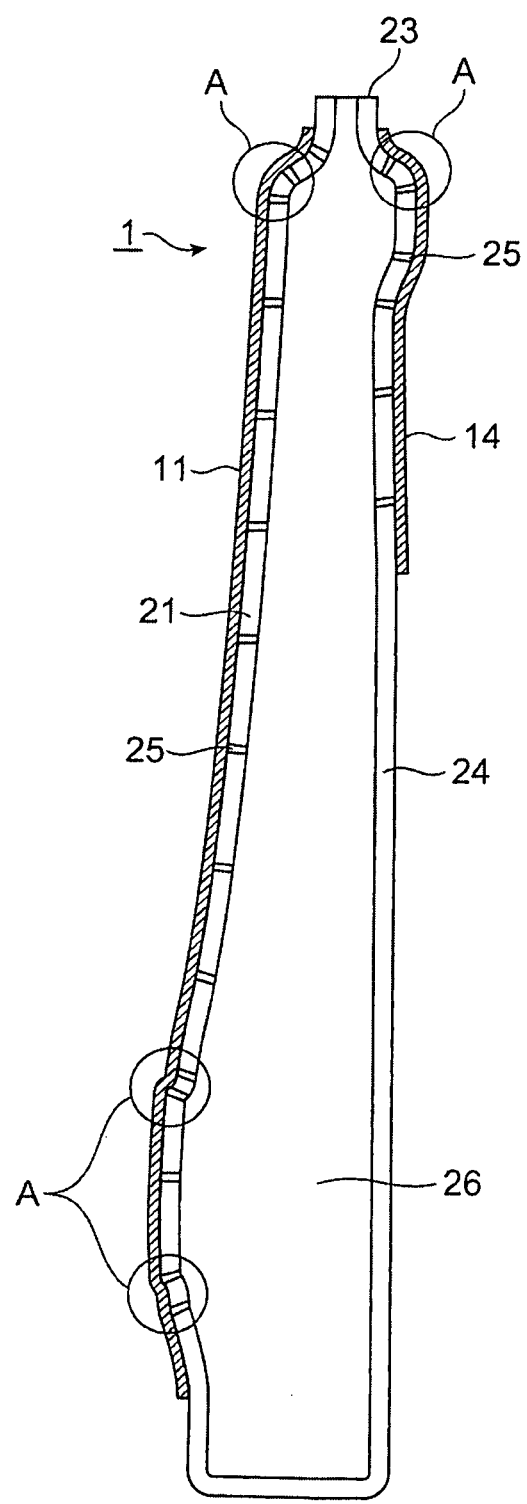
FIG. 9 is a longitudinal sectional view, as taken along line IX-IX of FIG. 8, of the seat-pad reinforcing cloth and the mold.

According to the invention, molds having corresponding convex and concave surfaces are not required because no press molding is done. Moreover, any special mold such as a slide core mold is not required for the molding of the roundabout portions 14 and 15 having the complicated shapes, as shown in FIG. 8 and FIG. 9. It is, therefore, possible to spare the cost and the time period for manufacturing the mold.

Figure 12:
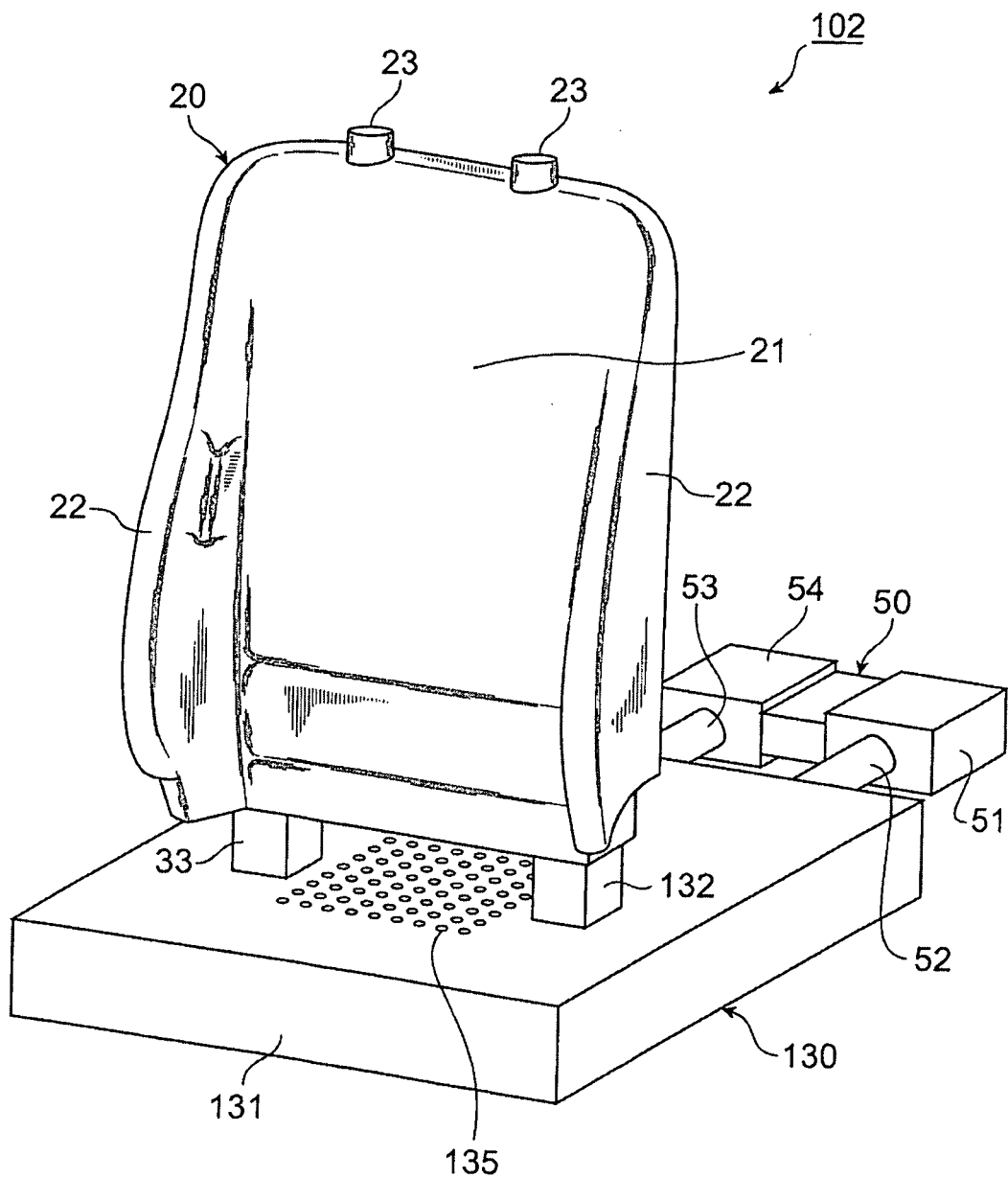
FIG. 12 is a perspective view showing a manufacturing apparatus for a seat-pad reinforcing cloth according to the second embodiment.

Referring now to FIG. 12, a second embodiment of the apparatus for manufacturing a seat-pad reinforcing cloth according to the present invention will be described. According to the second embodiment, heated air is supplied to the closed space through a pathway different from that of the first embodiment.

As shown in FIG. 12, in an apparatus 102 for manufacturing a seat-pad reinforcing cloth according to the second embodiment, by providing a plurality of air-supply holes 135 at a base 131 of a base portion 130, heated air is supplied to a closed space 41 without going through an internal space 26 on a mold 20. In the manufacturing apparatus 2 shown in FIG. 2, heated air is supplied to the internal space 26 of the mold 20 via an air-supply leg 32, while in a manufacturing apparatus 102 shown in FIG. 12, heated air is supplied to the closed space 41 via an air supply tube 52, an air-supply path (not shown) in the base portion 130, and an air-supply holes 135. Therefore, a leg 132 acts to fix the mold 20 to the base 131, but is structured not to connect an air-supply path in the base portion 130 with the internal space 26 of the mold 20.

Incidentally, in the manufacturing apparatus 102 shown in FIG. 12, elements identical with the manufacturing apparatus 2 shown in FIG. 2 are identified by the same reference numerals and duplicated descriptions are omitted.

Next, referring to FIG. 13, a third embodiment of the apparatus for manufacturing the reinforcing cloth of the seat pad according to the present invention will be described. The manufacturing apparatus according to the third embodiment is different from the manufacturing apparatus according to the first embodiment in that a closed space is formed in such a manner that a cover member covers a sheet fixed to a mold from front and back, and from sides, using a cover frame to which a cover member is fixed. In contrast, in the manufacturing apparatus according to the first embodiment, a closed space is formed in such that a cover member covers entire sheet fixed to a mold without any member such as the cover frame.

Figure 13:
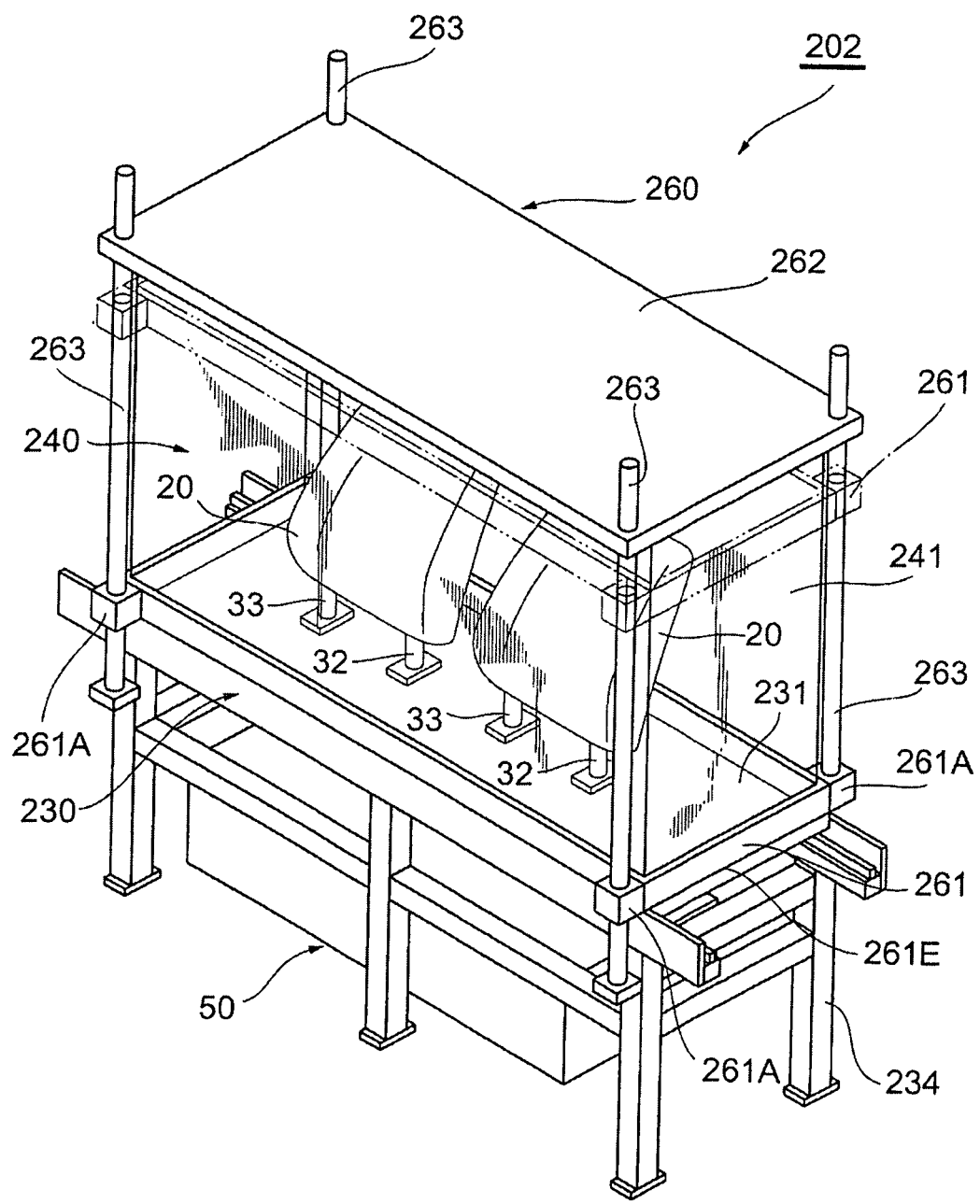
FIG. 13 is a perspective view showing a manufacturing apparatus for a seat-pad reinforcing cloth according to the third embodiment.

FIG. 13 is a perspective view showing an apparatus 202 for manufacturing the seat-pad reinforcing cloth according to the third embodiment.

The manufacturing apparatus 202 includes a mold 20; a base portion 230 to which the mold 20 is fixed; a cover member 240 which forms a closed space 241 by covering a sheet fixed to the mold 20 from front and back, and from sides; and a cover frame 260 being formed so as to enclose the mold 20 and to which the cover member 240 is fixed. Further, as with the case of the manufacturing apparatus 2 according to the first embodiment, the manufacturing apparatus 202 includes an air supply/exhaust unit 50 for supplying air to the closed space 241 and exhausting air from the closed space 241. In addition, the manufacturing apparatus 202 shown in FIG. 13 is able to manufacture two seat-pad reinforcing cloths at once by providing two molds 20 in the interior of the closed space 241.

The base portion 230 includes a base 231, a leg 234 for supporting the base 231, and an air-supply leg 32 and an air-exhaust leg 33 standingly provided from the base 231 and mounted independently to the mold 20. As with the case of the manufacturing apparatus 2 according to the first embodiment, the air-supply leg 32 and the air-exhaust leg 33 of the base portion 230, after being interconnected with the internal space 26 of the mold 20, constitute an air flow channel connecting the closed space 241 and the air supply/exhaust unit 50, together with the air-supply path and the air-exhaust path provided inside of the base 231.

The cover member 240 is a film in sheet-shape and can be the same material as used for a cover member 40 of the manufacturing apparatus 2 according to the first embodiment. The cover member 240 is fixed to the cover frame 260 so as to cover a sheet fixed to the mold 20 from front and back, and from sides, and forms the closed space 241 together with the cover frame 260 and the base portion 230. Incidentally, different from the case of the manufacturing apparatus 2 according to the first embodiment, the cover member 240 is fixed to an end part of the cover frame 260 (specifically, a movable frame 261 and a top panel 262, which will be described later), but not fixed to the base portion 230.

The air-supply/exhaust unit 50 is similar to the air-supply/exhaust unit used in the manufacturing apparatus 2 according to the first embodiment and is capable of heating the mold 20 and a non-woven fabric sheet 1B by supplying heated air to the internal space 26 of the mold 20 via the air-supply leg 32 or the like. Further, the air-supply/exhaust unit 50 can exhaust air in the closed space 241 via the air-exhaust leg 33 or the like.

The cover frame 260 includes the movable frame 261, the top panel 262 disposed opposing to the movable frame 261, and stanchions 263 at one end part of which are fixed against the top panel 262 and the other end part of which are fixed to the leg 234.

The movable frame 261 includes a penetration portion 261A through which the stanchion 263 penetrates, and is disposed so that it can move upwards and downwards along four stanchions 263. The aforementioned cover member 240 is disposed between the movable frame 261 and the top panel 262 and is fixed so that air inflow/outflow with respect to the closed space 241 may not occur at end parts of the movable frame 261 and the top panel 262. With this construction, a sufficient space is secured for a worker to fix the non-woven fabric sheet 1B to the mold 20 under such a state where the movable frame 261 is elevated to a position close to the top panel 262 (in FIG. 13, movable frame 261 shown by chain double-dashed lines), and the closed space 241 is formed under such a state where the movable frame 261 is lowered to a position where it makes contact with a base 231 (in FIG. 13, the movable frame 261 shown by solid lines). Incidentally, a packing, an adhesive tape or the like is disposed on an end face 261E where the movable frame 261 and the base 231 contact each other in consideration of prevention of air inflow/outflow with respect to the closed space 241 via the end face 261E.

With the apparatus 202 for manufacturing the reinforcing cloth of the seat pad according to the third embodiment, different from the first and the second embodiments, the closed space 241 is formed by a movement of the movable frame 261 of the cover frame 260. Therefore, since it is possible to form the closed space 241 by a movement of the movable frame 261 that is a part of the cover frame 260, not only the closed space 241 can be formed with ease, but also a time required for forming can be shortened. Especially, in a case where the movable frame 261 is configured to be capable of being driven by a driving apparatus, a series of manufacturing steps by the manufacturing apparatus can be automated with ease.

Next, referring to FIGS. 14 to 16, a fourth embodiment of the apparatus for manufacturing the reinforcing cloth of seat pad according to the present invention will be described. Although the manufacturing apparatus according to the fourth embodiment is identical with the manufacturing apparatus 202 according to the third embodiment in that the cover frame, to which the cover member is fixed, is provided, a difference is that the cover frame moves in a horizontal direction. Further, it is different from the manufacturing apparatus 202 according to the third embodiment in that the inside and the outside of the closed space are interconnected via a duct provided to the cover frame.

Figure 14:
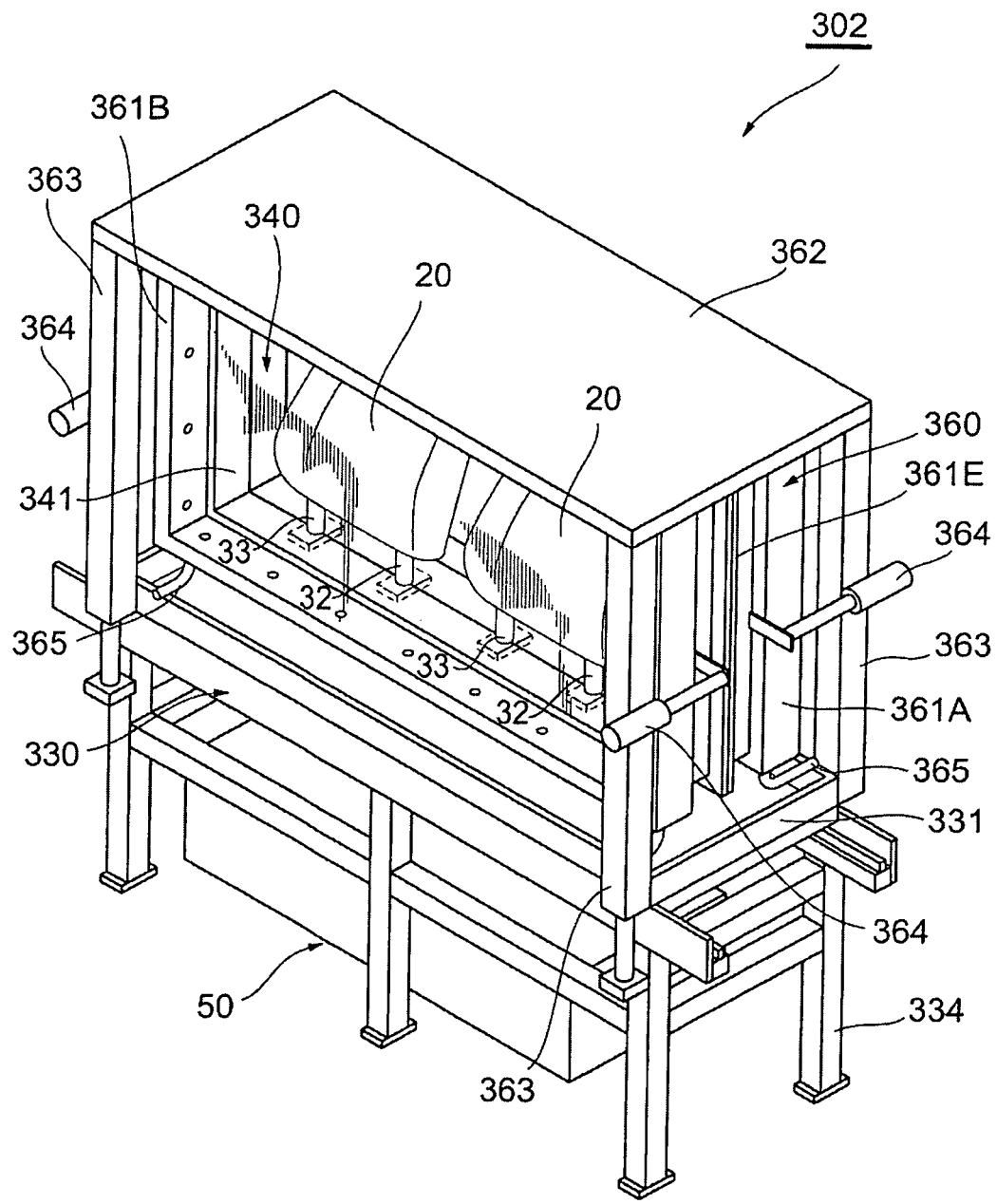
FIG. 14 is a perspective view showing a manufacturing apparatus for a seat-pad reinforcing cloth according to the fourth embodiment.

FIG. 14 is a perspective view showing an apparatus 302 for manufacturing a seat-pad reinforcing cloth according to the fourth embodiment. FIG. 15 is a perspective view showing movable frames 361A and 361B constituting a cover frame 360 of the manufacturing apparatus 302.

The apparatus 302 for manufacturing the seat-pad reinforcing cloth includes a mold 20, a base portion 330 to which the mold 20 is fixed, a cover member 340 which forms a closed space 341 by covering the mold 20 from front and back, and the cover frame 360 which is formed so as to enclose the mold 20 and to which the cover member 340 is fixed. Further, as with the case of the manufacturing apparatus according to the first embodiment, the manufacturing apparatus 302 includes an air supply/exhaust unit 50 for supplying air to the closed space 341 and exhausting air from the closed 341. Furthermore, as with the case of the manufacturing apparatus according to the third embodiment, the apparatus 302 for manufacturing the seat-pad reinforcing cloth shown in FIG. 14 is capable of manufacturing two seat-pad reinforcing cloths at once by providing two molds 20 in the interior of the closed space 341.

A base portion 330 includes a base 331, a leg 334 for supporting the base 331, and an air-supply leg 32 and an air-exhaust leg 33 standingly provided from the base 331 and mounted independently to the mold 20. As with the case of the manufacturing apparatus 2 according to the first embodiment, the air-supply leg 32 and the air-exhaust leg 33 of the base portion 330, after being interconnected with the internal space 26 of the mold 20, constitute an air flow channel connecting the closed space 341 and the air supply/exhaust unit 50, together with the air-supply path and the air-exhaust path provided inside of the base 331. Incidentally, different from the case of the aforementioned third embodiment, with the manufacturing apparatus 302 according to this fourth embodiment, the closed space 341 is formed by the cover member 340, the cover frame 360, the air-supply leg 32 and the air-exhaust leg 33 of the base portion 330, while the base 331 is not involved directly with formation of the closed space 341.

The cover member 340 is a film in sheet-shape and can be the similar material to that used for the cover member 40 of the manufacturing apparatus 2 according to the first embodiment. This cover member 340 is fixed to the cover frame 360 so as to cover from front and back the mold 20, and forms the closed space 341. Incidentally, different from the case of the manufacturing apparatus 202 according to the third embodiment, the cover member 340 is fixed only to an end part of the cover frame 360 (specifically, movable frames 361A and 361B which will be described later).

The air-supply/exhaust unit 50 is similar to the air-supply/exhaust unit used in the manufacturing apparatus 2 according to the first embodiment and is capable of heating the mold 20 and the non-woven fabric sheet 1B by supplying heated air to the internal space 26 of the mold 20 via the air-supply leg 32 or the like. Further, the air-supply/exhaust unit 50 can exhaust air in the closed space 341 via the air-exhaust leg 33 or the like.

The cover frame 360 includes two movable frames 361A and 361B, a top panel 362 disposed at upper portion of the movable frames 361A and 361B, stanchions 363 for fixing the top panel 362 against a leg 334, an actuator 364 for moving the movable frames 361A and 361B in the horizontal direction, and a duct 365 for interconnecting the inside and the outside of the closed space 341.

The movable frames 361A and 361B are a pair of movable frames capable of being separated in the horizontal direction, and are disposed so as to be moveable in the horizontal direction by driving of the actuator 364 (a direction in parallel with a surface of the base 331 and of the top panel 362). The aforementioned cover member 340 is fixed so as to cover the mold 20 from front and back, so that air inflow/outflow with regard to the closed space 341 may not occur at each end part of the movable frames 361A and 361B. With this construction, a sufficient space is secured for a worker to fix the non-woven fabric sheet 1B to the mold 20 under such a state where the movable frames 361A and 361B are spaced. Further, the closed space 341 is formed under such a state where the movable frames 361A and 361B are in contact at an end face 361B (states as shown in FIGS. 14 and 15). Further, a packing, an adhesive tape or the like is disposed on an end face 361E where the movable frames 361A and 361B are in contact in consideration of prevention of air inflow/outflow with respect to the closed space 341 via the end face 361E.

Figure 15:
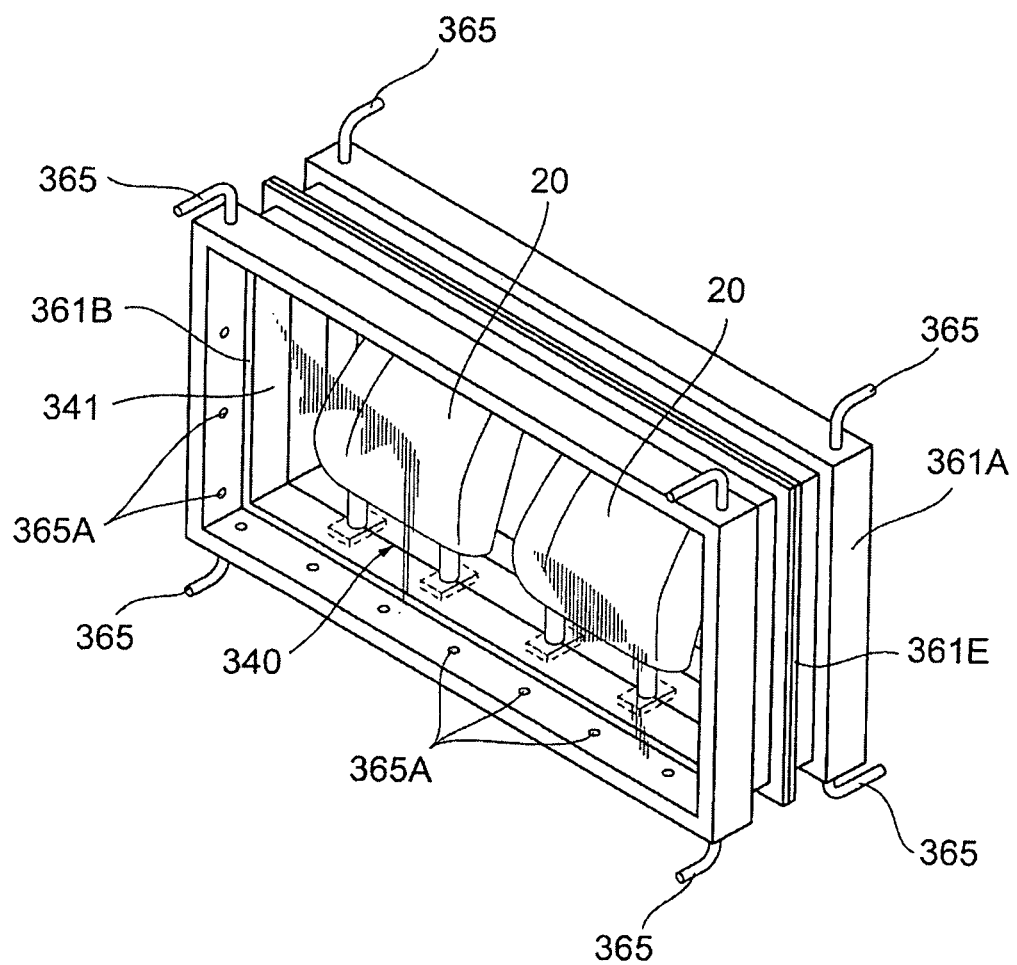
FIG. 15 is a perspective view showing a movable frame constituting a cover frame of the manufacturing apparatus shown in FIG. 14.

The duct 365 of the movable frames 361A and 361B is led to outside of the movable frames 361A and 361B via inside of the movable frames 361A and 361B (not shown) and is disposed so that the inside and the outside of the closed space 341 are interconnected via a plurality of openings 365A provided on a surface of the movable frames 361A and 361B (see FIG. 15). The duct 365 is independently connected to the air-supply/exhaust unit 50 via a suction/exhaust tube (not shown) and is constituted to allow supplying of heated air and exhausting of air from the closed space 341 by the air-supply/exhaust unit 50.

Figure 16:
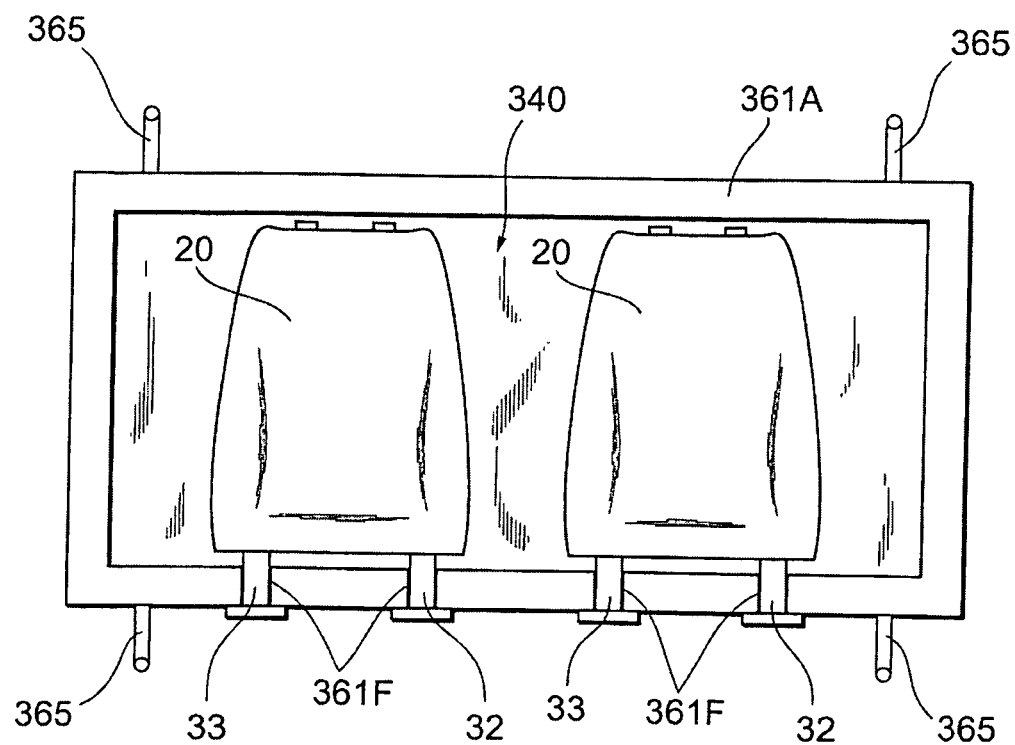
FIG. 16 is a front view where a movable frame is removed from those shown in FIG. 15.

FIG. 16 is a front view where the movable frame 361B is removed in FIG. 15 and shows positional relationship of the movable frame 361A and the base portion 330. With the apparatus 302 for manufacturing the seat-pad reinforcing cloth according to the fourth embodiment, the closed space 341 is formed by the cover member 340, the cover frame 360, and the air-supply leg 32 and the air-exhaust leg 33 of the base portion 330. Therefore, as shown in FIG. 16, a packing, an adhesive tape or the like is disposed on the end face 361F where the air-supply leg 32 and the air-exhaust leg 33 are in contact with the movable frames 361A and 361B in consideration of prevention of air inflow/outflow with respect to the closed space 341 via the end face 361F.

As mentioned above, with the apparatus 302 for manufacturing the seat-pad reinforcing cloth according to the fourth embodiment, the closed space 341 is formed by a movement of the movable frames 361A and 361B of the cover frame 360. Therefore, since a closed space is formed with ease by a movement of the movable frames 361A and 361B, compared with a case where the mold is covered using a cover member of bag-shape film, a time required for forming a closed space and a time for securing a space for demolding of the sheet after processing from the mold can be shortened. Further, since the movable frame 361 can be moved by the actuator 364, a series of manufacturing steps by the manufacturing apparatus can be automated with ease.

Moreover, the manufacturing apparatus 302 according to the fourth embodiment is constituted so that the inside and the outside of the closed space 341 are interconnected via the duct 365 of the movable frames 361A and 361B. Therefore, supplying of heated air and exhausting of air from the closed space 341 by the air-supply/exhaust unit 50 can be carried out via not only the internal space 26 of the mold 20, but also the duct 365. Therefore, since the number of supply/exhaust ports is increased as a whole apparatus, a time required for supplying of heated air and exhausting of air can be shortened. In other words, since it is possible to carry out exhausting of air from the closed space 341 and supplying of heated air to the closed space 341 via the duct of the movable frames 361A and 361B as well as the air holes 25 of the mold 20, a time requited for manufacturing the reinforcing cloth of the seat pad can be shortened.

Figure 17:
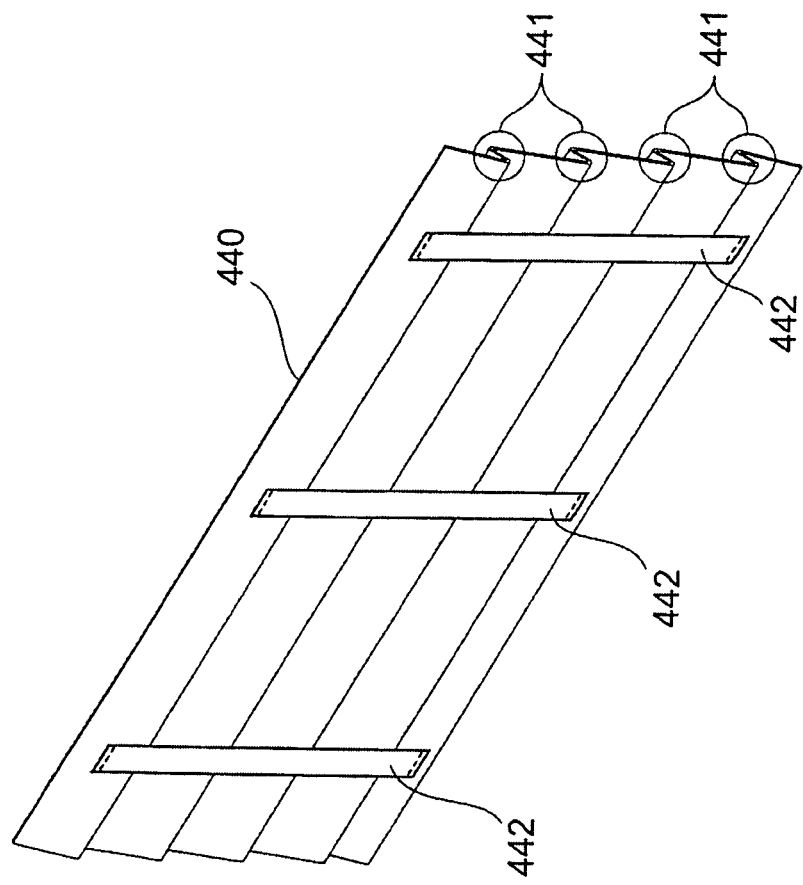
FIG. 17 is a perspective view showing a first modification of a cover member.
Figure 18:
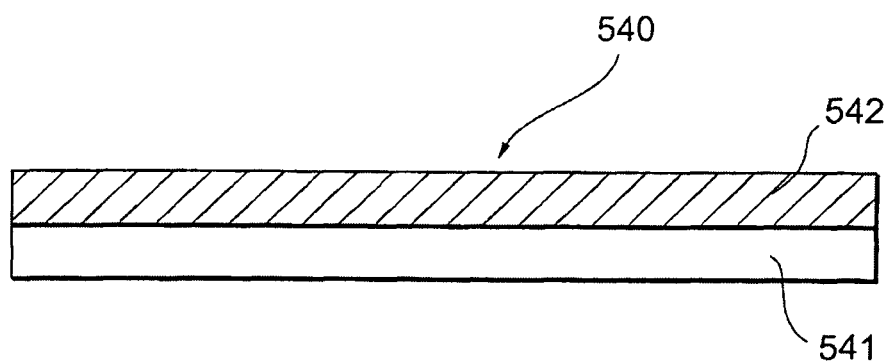
FIG. 18 is a sectional view showing a second modification of a cover member.

Referring now to FIGS. 17 and 18, a modification of a cover member will be described.

FIG. 17 is a perspective view showing a first modification of a cover member. A cover member 440 according to a first modification has a plurality of pleat portions 441 in a state before air in the closed space is exhausted. In other words, the existence of the pleat portions 441 is the difference from the cover member 40 using aforementioned bag-shaped film or the cover members 240 and 340 using a film in sheet-shape. Incidentally, "pleats" referred to here denotes a loosely overlapped portion or an allowance such as a drape of a curtain caused when a cloth is hung down. Additionally, the pleat portion 441 may be disposed so that a plurality of pleats is arranged regularly successively or irregularly successively.

An elastic cord 442 is fixed onto a surface of the cover member 440 so as to maintain shapes of the pleat portions 441. This elastic cord 442 is fixed to the cover member 440 by sewing, bonding or the like so as to intersect the pleat portion 441. As the elastic cord 442, for example, a rubber cord may be used.

When the cover member 440 according to the modification is used in place of the cover members 40, 240 and 340, the pleat portion 441 acts as an elongation margin while the non-woven fabric sheet 1B is processed to a shape along an outer shape of the mold 20. Therefore, the cover member 440 can exhibit higher shape followability for a mold 20 having a complex shape or a large roundabout portion.

Further, by providing the elastic cord 442 being fixed so as to maintain a shape of the pleat portion 441, when air is exhausted from the closed spaces 41, 241 and 341 in a step of processing the non-woven fabric sheet 1B along the outer shape of the mold 20, a large deformation to cope with approximate shape (outline shape) of the mold 20 can be followed by a deformation of the elastic cord 442, and a small deformation to cope with details of the mold 20 can be followed by a deformation of the pleat portion 441. Accordingly, in a case where the cover member 440 is greatly deformed to follow an approximate shape of the mold (e.g., initial stage of exhausting), pleat portions 441 are prevented from being one-sided to specific portion of the mold 20 and therefore, the cover member 440 can exhibit higher shape followability for the mold 20 having a complex shape or a large roundabout portion.

Moreover, the elastic cord 442 is fixed to the cover member 440 so as to intersect the pleat portion 441. With this construction, elongation margin does not become insufficient at processing since the pleat portion 441 does not become one-sided to specific portion of the cover member 440 due to own weight of the cover member 440 or the like before processing.

The cover member 440 having aforementioned features can cope with a large elongation and therefore, may be used preferably as a cover member to be mounted to the movable frame 261 in the third embodiment and the movable frames 361A and 361B in the fourth embodiment.

Although in FIG. 17, the pleat portion 441 is formed in a horizontal direction, a direction of forming the pleat portion 441 is not restricted to this exemplification and may be formed in vertical direction only or in both horizontal and vertical directions. Moreover, in a case where a pleat portion is formed in vertical direction, a gravitational force resulting in a collapse of the shape is not exerted and therefore, the pleat portion can maintain the shape even if an elastic cord is not provided for the vertical pleats.

FIG. 18 is a sectional view showing a second modification of a cover member. A cover member 540 according to the second modification is different from other cover members 40, 240, 340 and 440 in that it has a double-layer structure.

The cover member 540 includes a main layer 541 with air-tightness and a reinforcing layer 542 with tensile strength higher than that of the main layer. As materials constituting each layer, for the main layer 541, for example, a urethane film with air-tightness may be used. On the contrary, expandable raw materials in knit form (i.e., raw materials with knitted stitch) are preferably used for the reinforcing layer 542 and for example, jersey texture or cotton sheeting made of nylon, polyester, acrylic or the like, may be used. For the main layer 541 and the reinforcing layer 542, bonding is preferably used for lamination while the main layer 541 may be coated with respect to the reinforcing layer 542.

Moreover, as for arrangement of the main layer 541 and the reinforcing layer 542, the main layer 541 is disposed so as to form outside with respect to the closed spaces 41, 241, 341 and 441 while the reinforcing layer 542 is disposed on a surface of the main layer 541 at a side where the cover member 540 makes contact with the mold 20 (a side facing with closed spaces 41, 241, 341 and 441) and is fixed to the base portion 30 or the movable frames 261, 361A, 361B or the like.

If the cover member 540 according to the modification includes the main layer 541 with air-tightness and the reinforcing layer 542 with tensile strength higher than that of the main layer, damage to the main layer 541 attributable to an elongation caused at processing can be suppressed by the reinforcing layer 542, even in a case where thin and expandable raw materials are used for the main layer 541. Therefore, durability against repeated use of cover members is improved.

If the reinforcing layer 542 of the cover member 540 is disposed on a side contacting with the mold 20 and expandable raw materials in knit form are used, the reinforcing layer 542 with raw materials in knit form acts as a buffer layer against the main layer 541 when air in the closed space is exhausted and the reinforcing layer 542 comes to contact with the mold 20. Therefore, durability against repeated use of the cover member 540 is improved.

Next, referring to FIGS. 3 to 11, the method for manufacturing a seat-pad reinforcing cloth according to the present invention will be described. In the following description, a case of manufacturing a seat-pad reinforcing cloth 1 using the manufacturing apparatus according to the first embodiment is given.

Figure 3:
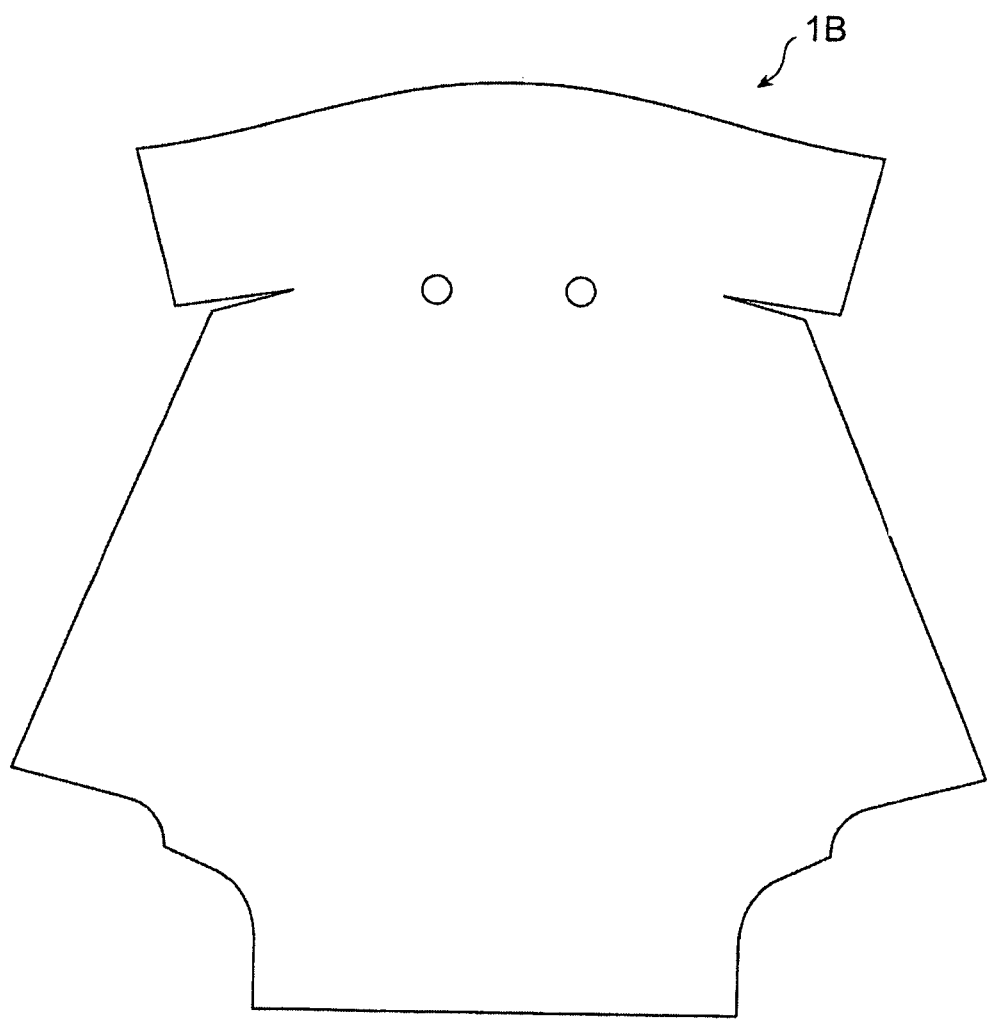
FIG. 3 is a view showing a roughly cut nonwoven fabric sheet or the seat-pad reinforcing cloth before shaped.

As shown in FIG. 3, the nonwoven fabric sheet 1B (i.e., the seat-pad reinforcing cloth 1 before molded) to be used in the present invention is supplied after roughly cut in the shape of the vehicular seat-pad reinforcing cloth to be used. The nonwoven fabric sheet 1B is thus cut to eliminate such troubles of cutting off the unnecessary portions as might be caused after the seat-pad reinforcing cloth was molded.

Figure 4:
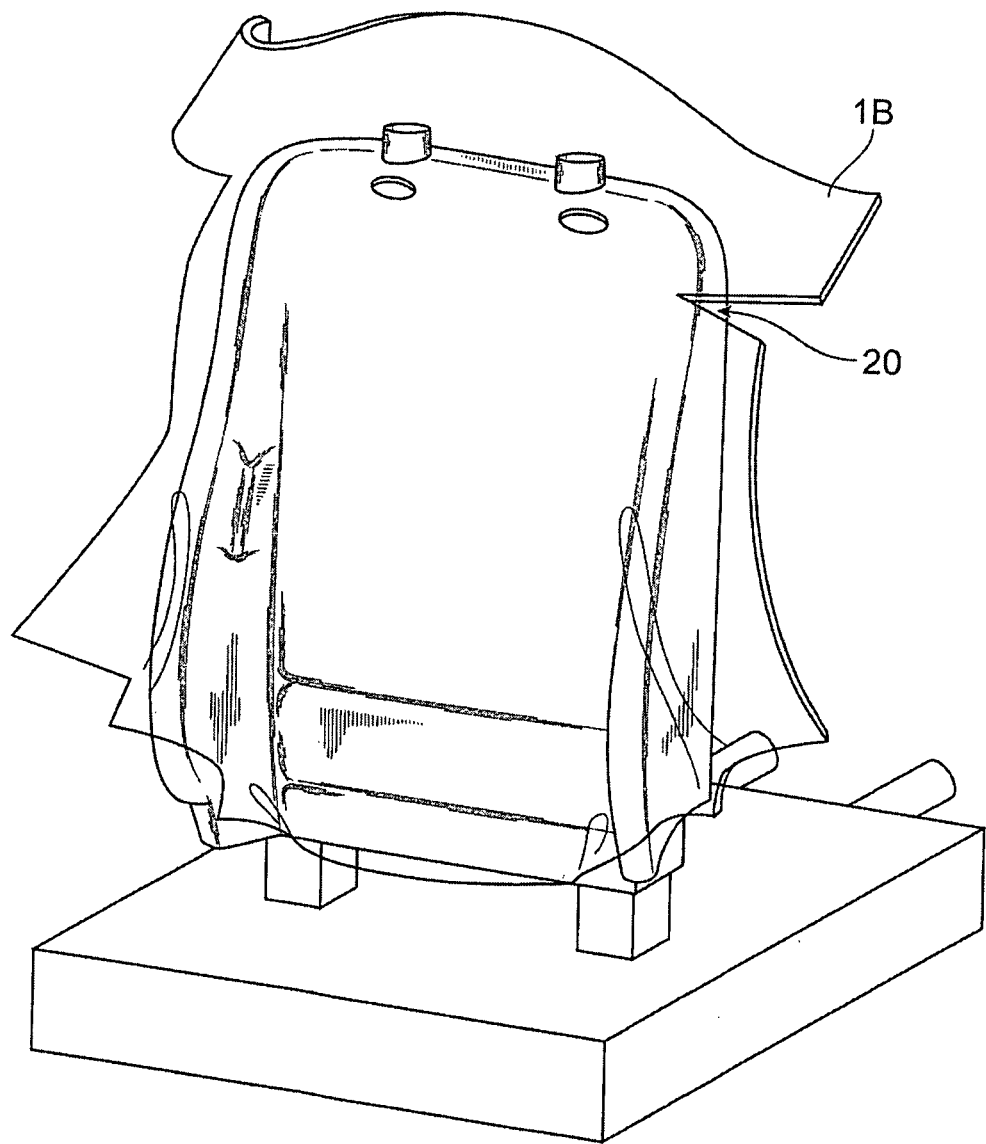
FIG. 4 is a view for explaining the step of fixing the roughly cut nonwoven fabric sheet on a mold.

The nonwoven fabric sheet 1B thus cut is put on the mold 20, as shown in FIG. 4, and is then fixed by magnets (not shown). These magnets have been attached in advance to the inner surface of the mold, and the nonwoven fabric sheet 1B is fixed by placing other magnets on the nonwoven fabric sheet 1B put on the mold 20. Alternatively, magnets or iron screws are buried in the mold 20, and the nonwoven fabric sheet 1B may be fixed by using magnets as members for holding the same. The nonwoven fabric sheet 1B is thus fixed so that it can be prevented from coming out when the heated air is supplied and exhausted by the air supply/exhaust unit 50. For an illustrative purpose, the nonwoven fabric sheet 1B is made transparent in FIG. 4.

Figure 5:
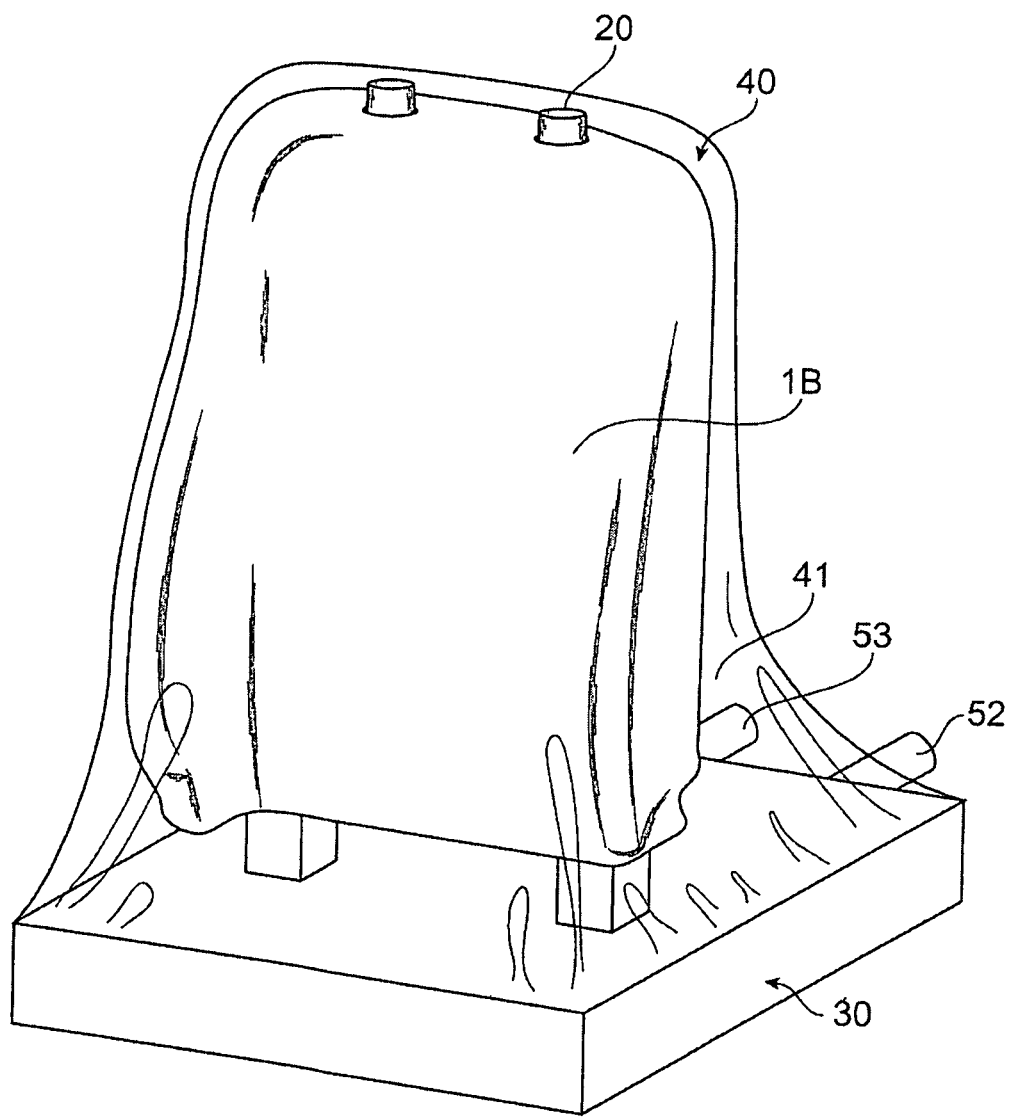
FIG. 5 is a view for explaining the step of putting a cover member on the mold having the nonwoven fabric sheet fixed thereon.

The nonwoven fabric sheet 1B is covered with the cover member 40 after the nonwoven fabric sheet 1B is fixed on the mold 20, as shown in FIG. 5, thereby to form the closed space 41 between the mold 20 and the cover member 40.

Figure 6:
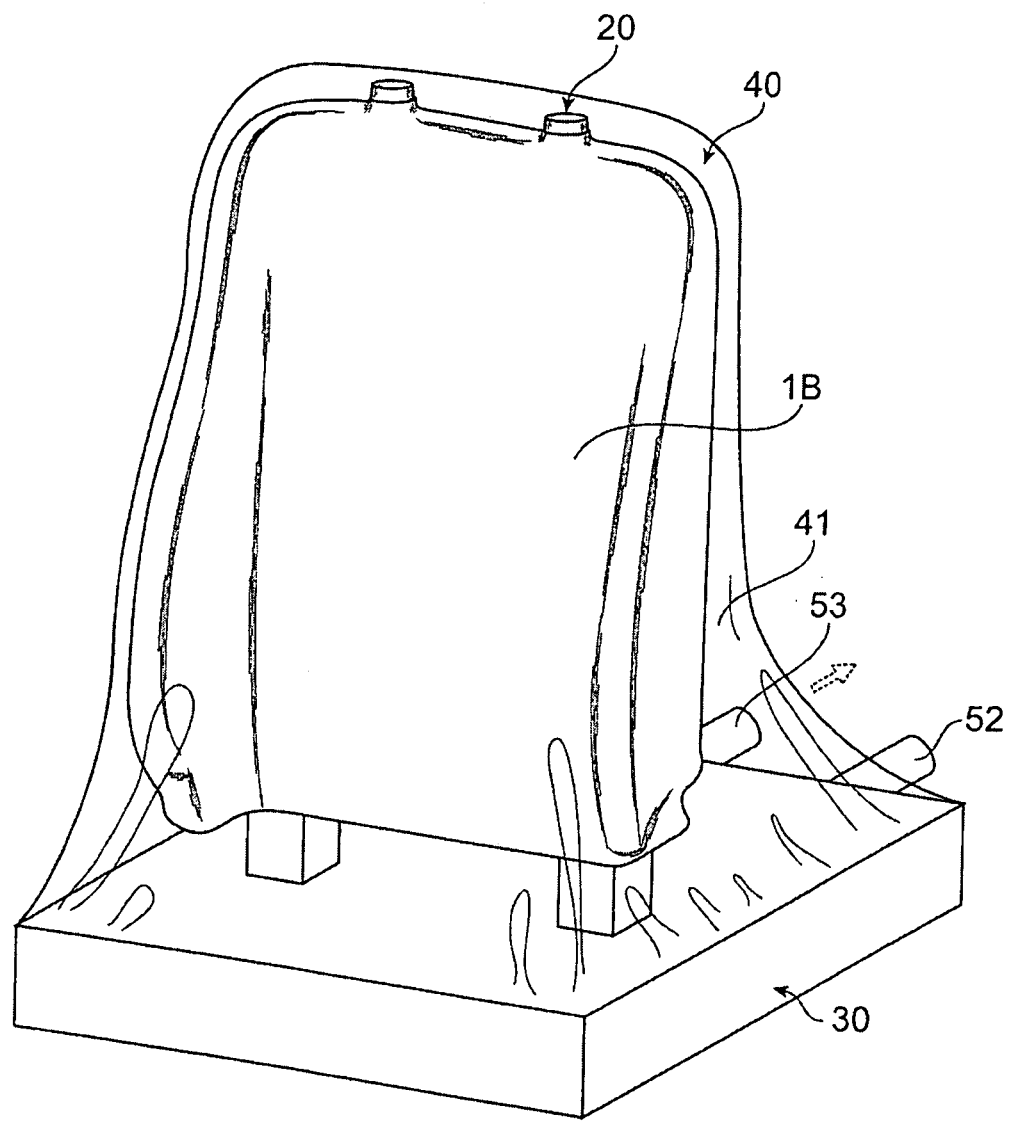
FIG. 6 is a view for explaining the step of exhausting air from the closed space defined by the mold and the cover member after covered with the cover member.

After the nonwoven fabric sheet 1B was covered with the cover member 40 (in other words, before the later-described step of heating the nonwoven fabric sheet 1B), as shown in FIG. 6, a preliminary air exhaust may be preferably executed to exhaust the air from the closed space 41 through the air holes 25 of the mold 20. Once the air in the closed space 41 is exhausted, the nonwoven fabric sheet 1B can be brought into close contact with the mold 20 by the cover member 40, so that the nonwoven fabric sheet 1B can be easily molded according to the shape of the outer surface of the mold 20.

Figure 7:
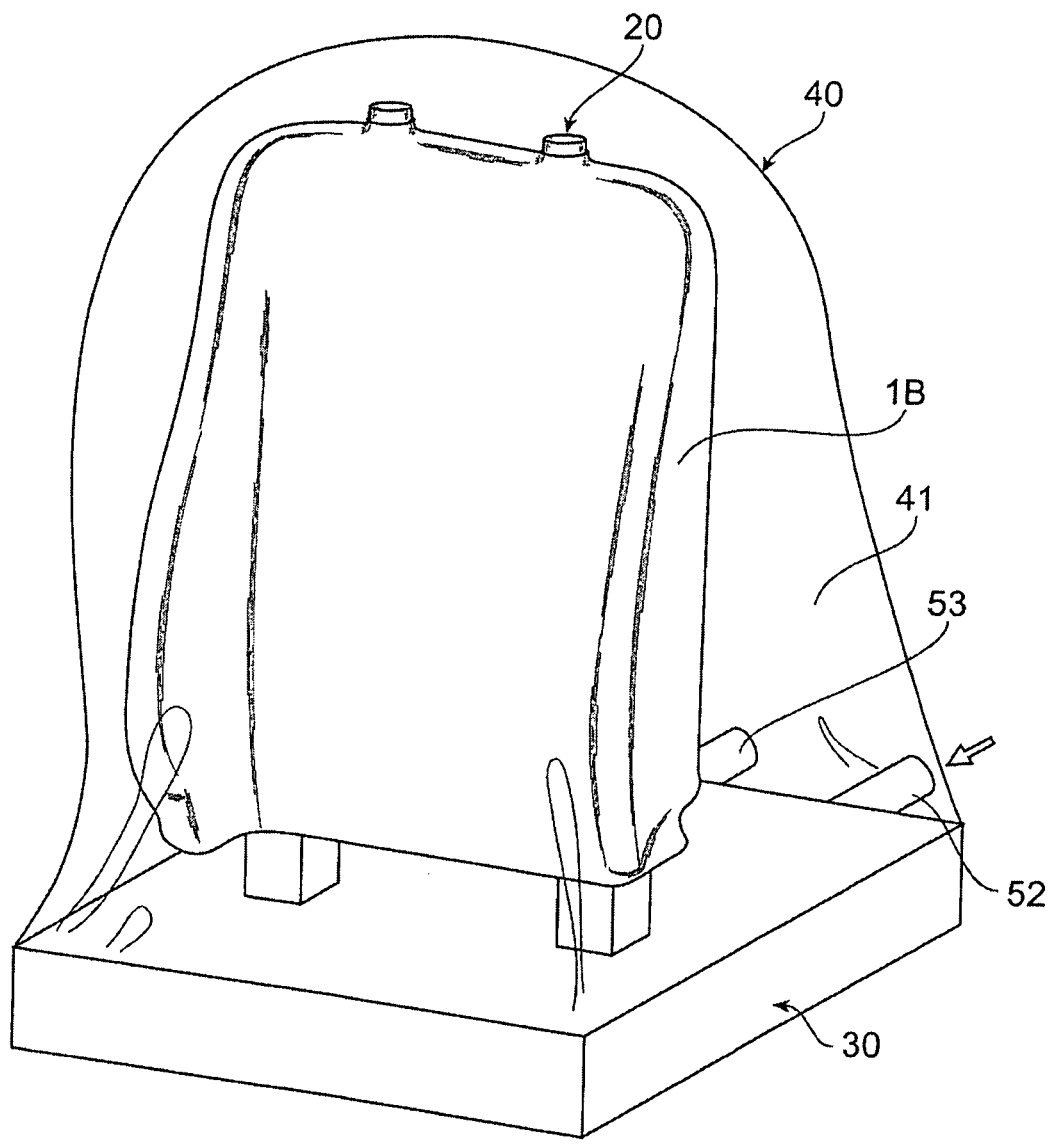
FIG. 7 is a view for explaining the step of supplying heated air (or heated steam) to the internal space of the mold.

After the closed space 41 was formed by the mold 20 and the cover member 40 (or after the aforementioned preliminary air exhaust), the heated air (including the heated steam) is then supplied to the inside of the mold 20 from the air-supply unit 51 (heating unit) of the air supply/exhaust unit 50, as shown in FIG. 7, to heat the nonwoven fabric sheet 1B and the mold 20. At this time, the heated air is supplied to the closed space 41 through the air holes 25 of the mold 20 so that the cover member 40 is inflated. With this construction, the nonwoven fabric sheet 1B can be heated by both the heated air and the heat from the mold, so that the supplied air is effectively utilized for heating the nonwoven fabric sheet 1B.

On the other hand, in the case of using the manufacturing apparatus 102 shown in FIG. 12, the heated air is directly supplied to the closed space 41 so that it can heat the nonwoven fabric sheet 1B like the case of using the manufacturing apparatus 2. The manufacturing apparatus 102 does not take the mode, in which the heated air is supplied to the closed space 41 from the internal space 26 of the mold 20 through the air holes 25. By performing the aforementioned preliminary air exhaust, therefore, the possibility that the nonwoven fabric sheet 1B is peeled off the mold 20 by the flow of the heated air can be reduced when the nonwoven fabric sheet 1B is in close contact with the mold 20.

In case the nonwoven fabric sheet 1B is made of the mixture of the low melting point fibers and the high melting point fibers, the temperature of the heated air is set to a level higher than the melting point of the low melting point fibers but lower than the melting point of the high melting point fibers.

The following is an example of the case of using the sheet, in which low melting point fibers and high melting point fibers were mixed.

Low melting point fibers (polyester: EE-7 [produced by UNITIKA FIBERS LTD.]): a fiber length of 41 mm, a fiber thickness of 6 d (deniers), a melting point of 110° C. (or a softening point of 90° C.), and a mixing percentage of 40 weight %

High melting point fibers (polyester: C300 Tetoron (Registered Trade Mark) [produced by TORAY INDUSTRIES, INC.]): a fiber length of 64 mm, a fiber thickness of 6 d (deniers), a melting point of 200° C. (or a softening point of 180° C.), and a mixing percentage of 60 weight %

Weight per unit area of the nonwoven fabric sheet 1B: 120 g/m$^2$

Temperature of the heated steam: 103° C.

Supply time of the heated air: 12 seconds

After the nonwoven fabric sheet 1B was heated, the air-exhaust unit 54 is activated to exhaust the air in the closed space 41, as shown in FIG. 8.

Figure 10:
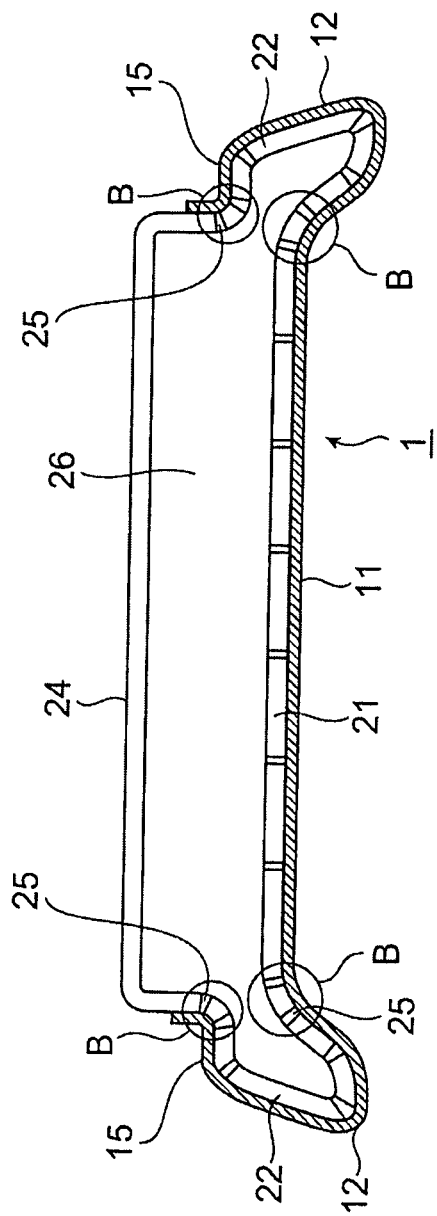
FIG. 10 is a transverse sectional view, as taken along line X-X of FIG. 8, of the seat-pad reinforcing cloth and the mold.

When the air-exhaust unit 54 acts, the air in the closed space 41 flows into the mold 20 through the nonwoven fabric sheet 1B having an air permeability and the air holes 25 of the mold 20, as shown in FIGS. 9 and 10. Moreover, since the inside of the mold 20 interconnects with the air-exhaust unit 54 through the air-exhaust leg 33, the air-exhaust passage of the base 31 and the air-exhaust pipe 53, the air in the closed space 41 can be exhausted. By the exhaust of the air, the inflated cover member 40 is deflated to be sucked by the mold 20. As the cover member 40 is deflated, the nonwoven fabric sheet 1B having been heated to a high plasticity is deformed to be sucked by the mold 20. As a result, the nonwoven fabric sheet 1B comes into close contact with the mold 20 so that it is shaped into a shape following the outer shape of the mold 20.

In the case of using the sheet in which the granular thermoplastic resin is contained in nonwoven fabrics, the air in the closed space 41 is exhausted while the thermoplastic resin being heated and melted, so that the nonwoven fabric sheet 1B is brought into close contact with the mold 20. After brought into close contact, the nonwoven fabric sheet 1B is cooled, and the thermoplastic resin is solidified. As a result, the nonwoven fabric sheet 1B can not only take a shape following the outer shape of the mold 20 but also have a proper rigidity to the seat-pad reinforcing cloth 1 after molded.

In the case of using the sheet in which the low melting point fibers and the high melting point fibers are mixed, the air in the closed space 41 is exhausted while the low melting point fibers are heated and melted, and the nonwoven fabric sheet 1B is brought into close contact with the mold 20. Then, while the nonwoven fabric sheet 1B is cooled after brought into close contact, the low melting point fibers are solidified on the high melting point fibers in the nonwoven fabric sheet 1B. Like the sheet containing the thermoplastic resin, therefore, the nonwoven fabric sheet 1B can not only take a shape following the outer shape of the mold 20 but also have a proper rigidity to the seat-pad reinforcing cloth 1 after molded.

Figure 11:
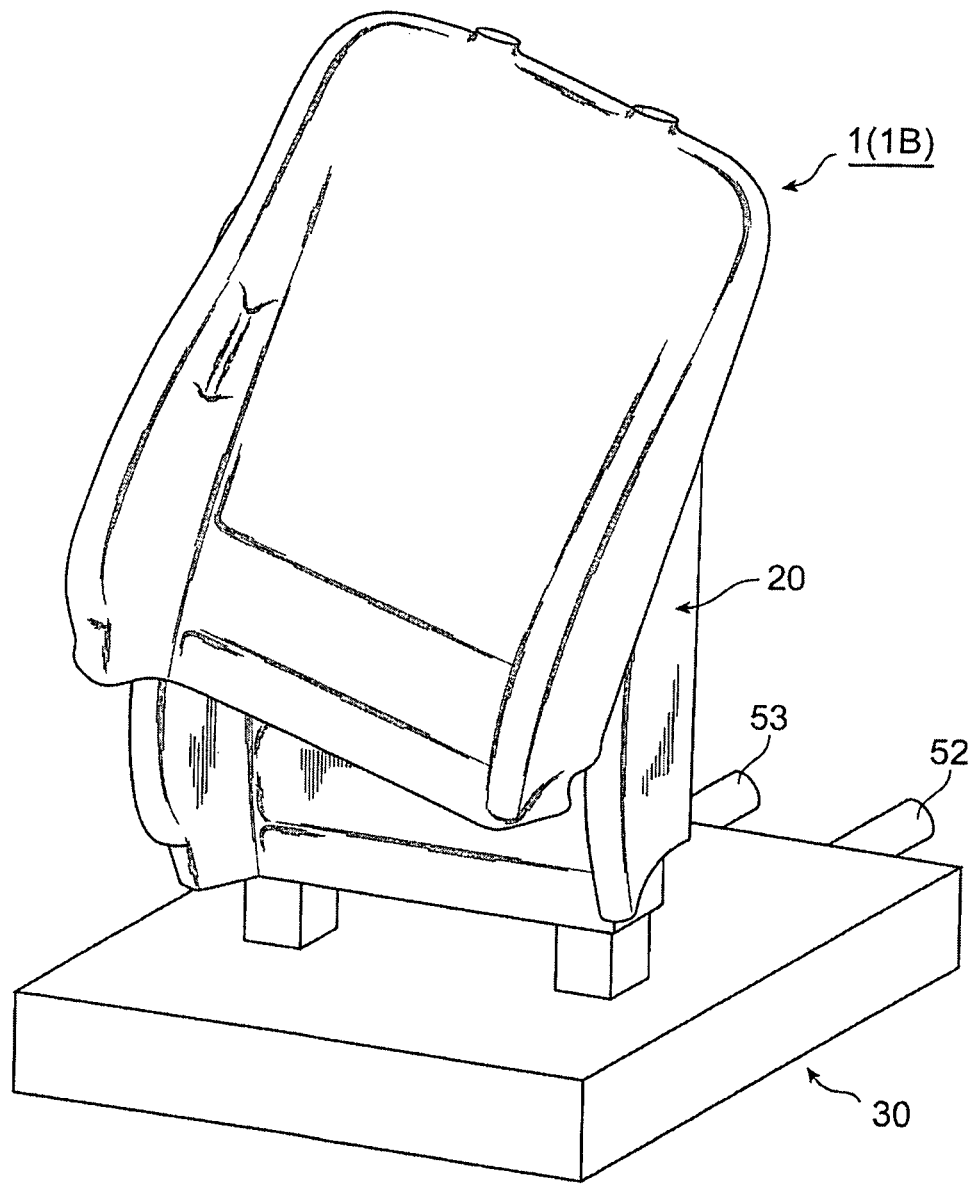
FIG. 11 is a view for explaining the step of demolding the seat-pad reinforcing cloth shaped from the nonwoven fabric sheet, from the mold by removing the cover member.

After the air in the closed space 41 is exhausted and the nonwoven fabric sheet 1B is cooled to a temperature for holding the shape, as shown in FIG. 11, the cover member 40 is removed, and the molded nonwoven fabric sheet 1B (i.e., the seat-pad reinforcing cloth 1) is demolded from the mold 20.

The cooled nonwoven fabric sheet 1B retains some rigidity, which does not obstruct demolding from the mold 20, so that the nonwoven fabric sheet 1B can be easily demolded.

Also, when the reinforcing cloth of the seat pad is manufactured using the manufacturing apparatus 202 according to the third embodiment shown in FIG. 13, it is possible to manufacture the seat-pad reinforcing cloth 1 by performing the same procedures as used for the manufacturing apparatus 2 according to the aforementioned first embodiment, except that the closed space 241 is formed by a movement of the movable frame 261 of the cover frame 260.

Further, when the reinforcing cloth of the sheet pad is manufactured using the manufacturing apparatus 302 according to the fourth embodiment shown in FIG. 14, it is possible to manufacture the seat-pad reinforcing cloth 1 by performing the same procedures as used for the manufacturing apparatus 2 according to the aforementioned first embodiment, except that the closed space 341 is formed by a movement of the movable frames 361A and 361B of the cover frame 360, and supplying of heated air and exhausting of air are performed using the duct 365.

In other words, it is possible to manufacture the reinforcing cloth of the seat pad by performing the same procedures as used for the manufacturing apparatus 2 according to the first embodiment, except that, in the step of forming a closed space, the closed space 241 (341) is formed by at least the mold 20, the cover member 240 (340) and the cover frame 260 (360) which is formed so as to enclose the mold 20 and to which the cover member 240 (340) is fixed. Incidentally, in the case of the manufacturing apparatus 202 according to the third embodiment, the base 231 of the base portion 230 contributes to formation of the closed space 241, and in the case of the manufacturing apparatus 302 according to the fourth embodiment, the air-supply leg 32 and the air-exhaust leg 33 of the base portion 330 contribute to formation of the closed space 341.

According to the present invention, the sheet is molded by fixing it on the mold, which is given a shape substantially identical to that of the seat pad, so that the molded sheet takes substantially the same shape as that of the desired seat-pad reinforcing cloth. As a result, not only the molding of the complicated shape having the roundabout portions can be facilitated, but also the turning-back or the like after the molding can be eliminated. Moreover, any selvage is not formed at the molded sheet so that it is not necessary to cut off after molding and the loss of the material is reduced.

Here, the present invention should not be limited to the embodiments thus far described but can naturally be modified in various manners without departing from the spirit thereof.

For example, although, the non-woven fabric sheet 1B is heated utilizing heated air in the apparatuses 2, 102, 202 and 302 for manufacturing the seat-pad reinforcing cloth according to the aforementioned embodiments, the non-woven fabric sheet 1B may be heated by heating the mold 20 itself using a heater or the like.

Further, the manufacturing apparatus 202 according to the third embodiment may be constituted in such that heated air is supplied to the closed space 41 via the air-supply path provided inside the base portion 130 and a plurality of air supply holes disposed to the base 231, while using the similar structure to that used for the base portion 130 in the manufacturing apparatus 102 according to the second embodiment.

Furthermore, the cover member 440 shown in FIG. 17 may be combined with the cover member having double-layer structure as shown in FIG. 18.

The invention claimed is:

1. An apparatus for manufacturing a reinforcing cloth of a seat pad, the apparatus comprising:
a mold with an internal space for fixing a sheet, formed as a hollow shell of a single material, the mold having an outer shape that is substantially identical to a shape of the reinforcing cloth, the mold including a plurality of air holes provided through the shell, the air holes interconnecting the internal space with an outer surface of the mold;
a cover member formed of a bag-shaped film, for forming a closed space inside thereof by covering the mold, the cover member being removable from the sheet after molding the sheet into a shape;
a heating unit for heating the sheet; and
an exhausting unit for exhausting air from the closed space,
wherein the heating unit supplies heated air to the closed space through the air holes of the mold by supplying the heated air to the internal space of the mold and the exhausting unit exhausts air from the closed space through the air holes of the mold,
wherein the cover member is capable of deflating to be sucked by the mold so that the sheet is deformed to be sucked and comes into close contact with the mold when the air in the closed space is exhausted by the exhausting unit, and
wherein a contour of an inner surface of the mold and a contour of an outer surface of the mold is substantially similar.

2. An apparatus for manufacturing a reinforcing cloth of a seat pad, the apparatus comprising:
a mold for fixing a sheet, the mold having an outer shape substantially identical to a shape of the reinforcing cloth and provided with a plurality of air holes interconnecting an internal space with an outer surface;
a cover member formed of a bag-shaped film, for forming a closed space inside thereof by covering the mold;
a heating unit for heating the sheet; and
an exhausting unit for exhausting air from the closed space,
wherein the heating unit supplies heated air to the closed space through the air holes of the mold by supplying the heated air to the internal space of the mold and the exhausting unit exhausts air from the closed space through the air holes of the mold, and
wherein the closed space is formed by at least the mold, the cover member, and the cover frame, and
wherein the cover frame includes a pair of movable frames capable of being separated in a horizontal direction, and the cover member is fixed to each of the movable frames.

3. The apparatus according to claim 2,
wherein the movable frame includes a duct interconnecting the inside and the outside of the closed space.

4. An apparatus for manufacturing a reinforcing cloth of a seat pad, the apparatus comprising:
a mold for fixing a sheet, the mold having an outer shape substantially identical to a shape of the reinforcing cloth and provided with a plurality of air holes interconnecting an internal space with an outer surface;
a cover member forming a closed space inside thereof by covering the mold;
a heating unit for heating the sheet; and
an exhausting unit for exhausting air from the closed space,
wherein the heating unit supplies heated air to the closed space through the air holes of the mold by supplying the heated air to the internal space of the mold and the exhausting unit exhausts air from the closed space through the air holes of the mold, and wherein the cover member has a pleat portion in a state before air in the closed space is exhausted.

5. The apparatus according to claim 4, wherein the cover member includes an elastic cord so as to maintain a shape of the pleat portion.

6. The apparatus according to claim 5, wherein the elastic cord is fixed to the cover member so as to intersect the pleat portion.

7. The apparatus according to claim 1, wherein the cover member includes a main layer with air-tightness and a reinforcing layer with tensile strength higher than that of the main layer, and
wherein the reinforcing layer is disposed on a surface of the main layer at a side where the cover member makes contact with the mold.

8. The apparatus according to claim 7, wherein the reinforcing layer is made of expandable raw materials in knit form.

9. An apparatus for manufacturing a reinforcing cloth of a seat pad, the apparatus comprising:
a mold for fixing a sheet, the mold having an outer shape substantially identical to a shape of the reinforcing cloth and provided with a plurality of air holes interconnecting an internal space with an outer surface;
a cover member forming a closed space inside thereof by covering the mold;
a heating unit for heating the sheet; and
an exhausting unit for exhausting air from the closed space, further comprising a cover frame to enclose the mold and to which the cover member is fixed,
wherein the closed space is formed by at least the mold, the cover member, and the cover frame; and
wherein the cover frame includes a pair of movable frames capable of being separated in a horizontal direction, and the cover member is fixed to each of the movable frames.

10. The apparatus according to claim 9, wherein the movable frame includes a duct interconnecting the inside and the outside of the closed space.

11. An apparatus for manufacturing a reinforcing cloth of a seat pad, the apparatus comprising:
a mold for fixing a sheet, the mold having an outer shape substantially identical to a shape of the reinforcing cloth and provided with a plurality of air holes interconnecting an internal space with an outer surface;
a cover member forming a closed space inside thereof by covering the mold;
a heating unit for heating the sheet; and
an exhausting unit for exhausting air from the closed space,
wherein the cover member has a pleat portion in a state before air in the closed space is exhausted, and
wherein the cover member includes an elastic cord so as to maintain a shape of the pleat portion.

12. The apparatus according to claim 11, wherein the elastic cord is fixed to the cover member so as to intersect the pleat portion.

13. The apparatus for manufacturing a reinforcing cloth of a seat pad according to claim 1, wherein the mold has a front portion and a rear portion opposed to the front portion with the internal space in between, and the front portion and the rear portion are provided with the air holes.

14. The apparatus for manufacturing a reinforcing cloth of a seat pad according to claim 1, wherein there are more numbers of the air holes formed in the corner portions of the mold than in the remaining portions of the mold.

15. The apparatus for manufacturing a reinforcing cloth of a seat pad according to claim 1, wherein a volume of the internal space is bigger than a volume of the shell of the mold.

16. The apparatus for manufacturing a reinforcing cloth of a seat pad according to claim 1, further comprising:
a base for mounting the mold; and
a hollow leg erected from the base and attached to the mold,
wherein the heated air is supplied to the internal space of the mold through the base and the hollow leg while air in the internal space of the mold is exhausted through the hollow leg and the base.

17. The apparatus for manufacturing a reinforcing cloth of a seat pad according to claim 16, wherein the cover member is configured to cover the mold and be fixed to the base to form the closed space inside thereof.

18. The apparatus for manufacturing a reinforcing cloth of a seat pad according to claim 16, wherein the cover member is configured to cover the mold and be fixed to the hollow leg to form the closed space inside thereof.

* * * * *

UNITED STATES PATENT AND TRADEMARK OFFICE
CERTIFICATE OF CORRECTION

| | |
|---|---|
| PATENT NO. | : 8,926,309 B2 |
| APPLICATION NO. | : 12/370678 |
| DATED | : January 6, 2015 |
| INVENTOR(S) | : Shimada et al. |

It is certified that error appears in the above-identified patent and that said Letters Patent is hereby corrected as shown below:

On the title page, Item (54)

Change "METHOD OF MANUFACTURING REINFORCING CLOTH OF A SEAT PAD AND APPARATUS THEREFOR" to -- METHOD OF MANUFACTURING REINFORCING CLOTH OF SHEET PAD AND APPARATUS THEREFOR --

On the title page, Item (62) insert

-- This application is a DIV of 11/367,606 03/04/2006 --

On the title page, Item (30) should read

JAPAN P2005-062894 03/07/2005
JAPAN P2006-031487 02/08/2006

Signed and Sealed this
Twenty-fifth Day of August, 2015

Michelle K. Lee
*Director of the United States Patent and Trademark Office*

UNITED STATES PATENT AND TRADEMARK OFFICE
CERTIFICATE OF CORRECTION

| | |
|---|---|
| PATENT NO. | : 8,926,309 B2 |
| APPLICATION NO. | : 12/370678 |
| DATED | : January 6, 2015 |
| INVENTOR(S) | : Shimada et al. |

Page 1 of 1

It is certified that error appears in the above-identified patent and that said Letters Patent is hereby corrected as shown below:

On the title page, Item (54) and in the specification, Col. 1, Lines 1-3

Change "METHOD OF MANUFACTURING REINFORCING CLOTH OF A SEAT PAD AND APPARATUS THEREFOR" to -- METHOD OF MANUFACTURING REINFORCING CLOTH OF SHEET PAD AND APPARATUS THEREFOR --

On the title page, Item (62) insert

-- This application is a DIV of 11/367,606 03/04/2006 --

On the title page, Item (30) should read

JAPAN P2005-062894 03/07/2005
JAPAN P2006-031487 02/08/2006

This certificate supersedes the Certificate of Correction issued August 25, 2015.

Signed and Sealed this
Seventeenth Day of November, 2015

Michelle K. Lee
*Director of the United States Patent and Trademark Office*